United States Patent
Chen

(10) Patent No.: US 12,058,385 B2
(45) Date of Patent: Aug. 6, 2024

(54) LIVESTREAMING PROCESSING METHOD AND APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventor: Chunyong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 85 days.

(21) Appl. No.: 17/872,917

(22) Filed: Jul. 25, 2022

(65) Prior Publication Data

US 2022/0360825 A1 Nov. 10, 2022

Related U.S. Application Data

(63) Continuation of application No. PCT/CN2021/100866, filed on Jun. 18, 2021.

(30) Foreign Application Priority Data

Aug. 6, 2020 (CN) .......................... 202010782360.7

(51) Int. Cl.
*H04N 21/2187* (2011.01)
*G06Q 30/0241* (2023.01)
*G06Q 50/00* (2024.01)

(52) U.S. Cl.
CPC ..... *H04N 21/2187* (2013.01); *G06Q 30/0277* (2013.01); *G06Q 50/01* (2013.01)

(58) Field of Classification Search
CPC . H04N 21/2187; G06Q 30/0277; G06Q 50/01
See application file for complete search history.

(56) References Cited

U.S. PATENT DOCUMENTS

2015/0326945 A1* 11/2015 Johnson ............... H04N 21/472
725/32
2017/0111565 A1* 4/2017 Shibahara ............ H04N 21/242
(Continued)

FOREIGN PATENT DOCUMENTS

CN 106792081 A 5/2017
CN 108769723 A 11/2018
(Continued)

OTHER PUBLICATIONS

Tencent Technology, ISR, PCT/CN2021/100866, Sep. 23, 2021, 2 pgs.

(Continued)

*Primary Examiner* — Randy A Flynn
(74) *Attorney, Agent, or Firm* — Morgan, Lewis & Bockius LLP

(57) ABSTRACT

This application provides a livestreaming processing method performed by an electronic device. The method includes: obtaining real-time livestreaming data of a livestreaming room while displaying livestreaming content of the livestreaming room; acquiring a portion of the livestreaming content of the livestreaming room according to the real-time livestreaming data, and generating a promotion video according to the acquired portion of the livestreaming content; and; and transmitting the promotion video to a plurality of social networking accounts of a social networking application, wherein the transmitted promotion video provides an option for a user associated with one of the plurality of social networking accounts to join the livestreaming room.

20 Claims, 15 Drawing Sheets

(56) References Cited

U.S. PATENT DOCUMENTS

| | | | | |
|---|---|---|---|---|
| 2017/0157512 A1* | 6/2017 | Long | ................... | G11B 27/034 |
| 2017/0171614 A1* | 6/2017 | el Kaliouby | ....... | H04N 21/2187 |
| 2017/0289589 A1* | 10/2017 | Koumchatzky | ...... | H04N 21/251 |
| 2019/0108536 A1 | 4/2019 | Benamara | | |
| 2019/0199763 A1* | 6/2019 | Demirli | ............... | H04L 65/4025 |
| 2019/0253751 A1 | 8/2019 | Lin et al. | | |
| 2020/0322412 A1* | 10/2020 | Kellicker | ........... | H04N 21/2402 |
| 2020/0342979 A1* | 10/2020 | Sadowsky | .............. | G06V 40/28 |
| 2021/0093968 A1* | 4/2021 | McCoy | .................. | A63F 13/67 |

FOREIGN PATENT DOCUMENTS

| | | |
|---|---|---|
| CN | 109862381 A | 6/2019 |
| CN | 111918085 A | 11/2020 |

OTHER PUBLICATIONS

Tencent Technology, WO, PCT/CN2021/100866, Sep. 23, 2021, 4 pgs.
Tencent Technology, IPRP, PCT/CN2021/100866, Feb. 7, 2023, 5 pgs.

\* cited by examiner

LIVESTREAMING PROCESSING METHOD AND APPARATUS, ELECTRONIC DEVICE, AND COMPUTER-READABLE STORAGE MEDIUM

CROSS-REFERENCE TO RELATED APPLICATIONS

This application is a continuation application of PCT Patent Application No. PCT/CN2021/100866, entitled "LIVE STREAMING PROCESSING METHOD AND APPARATUS, AND ELECTRONIC DEVICE AND COMPUTER READABLE STORAGE MEDIUM" filed on Jun. 18, 2021, which claims priority to Chinese Patent Application No. 202010782360.7, filed with the State Intellectual Property Office of the People's Republic of China on Aug. 6, 2020, and entitled "LIVE STREAMING PROCESSING METHOD AND DEVICE, ELECTRONIC EQUIPMENT AND COMPUTER READABLE STORAGE MEDIUM", all of which are incorporated herein by reference in their entirety.

FIELD OF THE TECHNOLOGY

This application relates to the field of Internet technologies, and in particular, to a livestreaming processing method and apparatus, an electronic device, and a computer-readable storage medium.

BACKGROUND OF THE DISCLOSURE

Livestreaming-based online social networking has become an important form of Internet information dissemination. A livestreamer's performance is synchronized to viewers in a livestreaming room through a network. The livestreamer's performance is delivered to the viewers through livestreaming, and the viewers watching the livestreamer's performance may be categorized into two groups. One group includes historical viewers who have watched the livestreamer's performance before, and the other group includes new viewers who have entered the livestreaming room for the first time. To maximize the delivery of the livestreamer's performance to viewers, it is necessary to attract as many new viewers as possible to enter the livestreaming room.

The related technology supports advertising of livestreaming before the livestreaming is started to attract new viewers to enter the livestreaming room. This requires the prediction of attractiveness of livestreaming content to viewers. Because both the scale and the mobility of viewers on a livestreaming platform are high, the beforehand prediction of the attractiveness of the livestreaming content to viewers and corresponding content advertising excessively consume server resources and can hardly produce a satisfying promotional effect.

SUMMARY

Embodiments of this application provide a livestreaming processing method and apparatus, an electronic device, and a computer-readable storage medium, which can promote livestreaming in a resource saving manner, thereby improving the recommendation efficiency and the utilization of recommended resources.

The technical solutions in the embodiments of this application are implemented as follows:

The embodiments of this application provide a livestreaming processing method, the method being performed by an electronic device, including:
  obtaining real-time livestreaming data of a livestreaming room while displaying livestreaming content of the livestreaming room;
  acquiring a portion of the livestreaming content of the livestreaming room according to the real-time livestreaming data, and generating a promotion video according to the acquired portion of the livestreaming content; and
  transmitting the promotion video to a plurality of social networking accounts of a social networking application, wherein the transmitted promotion video provides an option for a user associated with one of the plurality of social networking accounts to join the livestreaming room.

An embodiment of this application provides a livestreaming processing apparatus, including:
  an obtaining module, configured to: obtain real-time livestreaming data of a livestreaming room and display livestreaming content of the livestreaming room according to the real-time livestreaming data;
  an acquisition module, configured to: acquire a portion of the livestreaming content of the livestreaming room according to the real-time livestreaming data, and generate a promotion video according to the acquired portion of the livestreaming content; and
  a transmission module, configured to transmit the promotion video to a plurality of social networking accounts of a social networking application, wherein the transmitted promotion video provides an option for a user associated with one of the plurality of social networking accounts to join the livestreaming room.

The embodiments of this application provide an electronic device, the electronic device including:
  a memory, configured to store executable instructions; and
  a processor, configured to execute the executable instructions stored in the memory and cause the electronic device to implement the livestreaming processing method provided in the embodiments of this application.

The embodiments of this application provide a non-transitory computer-readable storage medium, storing executable instructions that, when being executed by a processor of an electronic device, cause the electronic device to implement the livestreaming processing method provided in the embodiments of this application.

The embodiments of this application have the following beneficial effects:

As livestreaming content displayed in a promotion video comes from the performance in a livestreaming room, the performance that a user enters the livestreaming room to watch is related to the content of the promotion video, so that resources are prevented from being consumed for invalid recommendation, thereby improving the visit retention rate of the livestreaming room and improving the promotion effect of the livestreaming room. In addition, the promotion video is obtained with reference to real-time data in the livestreaming room, thereby improving the timeliness of the promotion video.

DESCRIPTION OF EMBODIMENTS

Figure 1A:
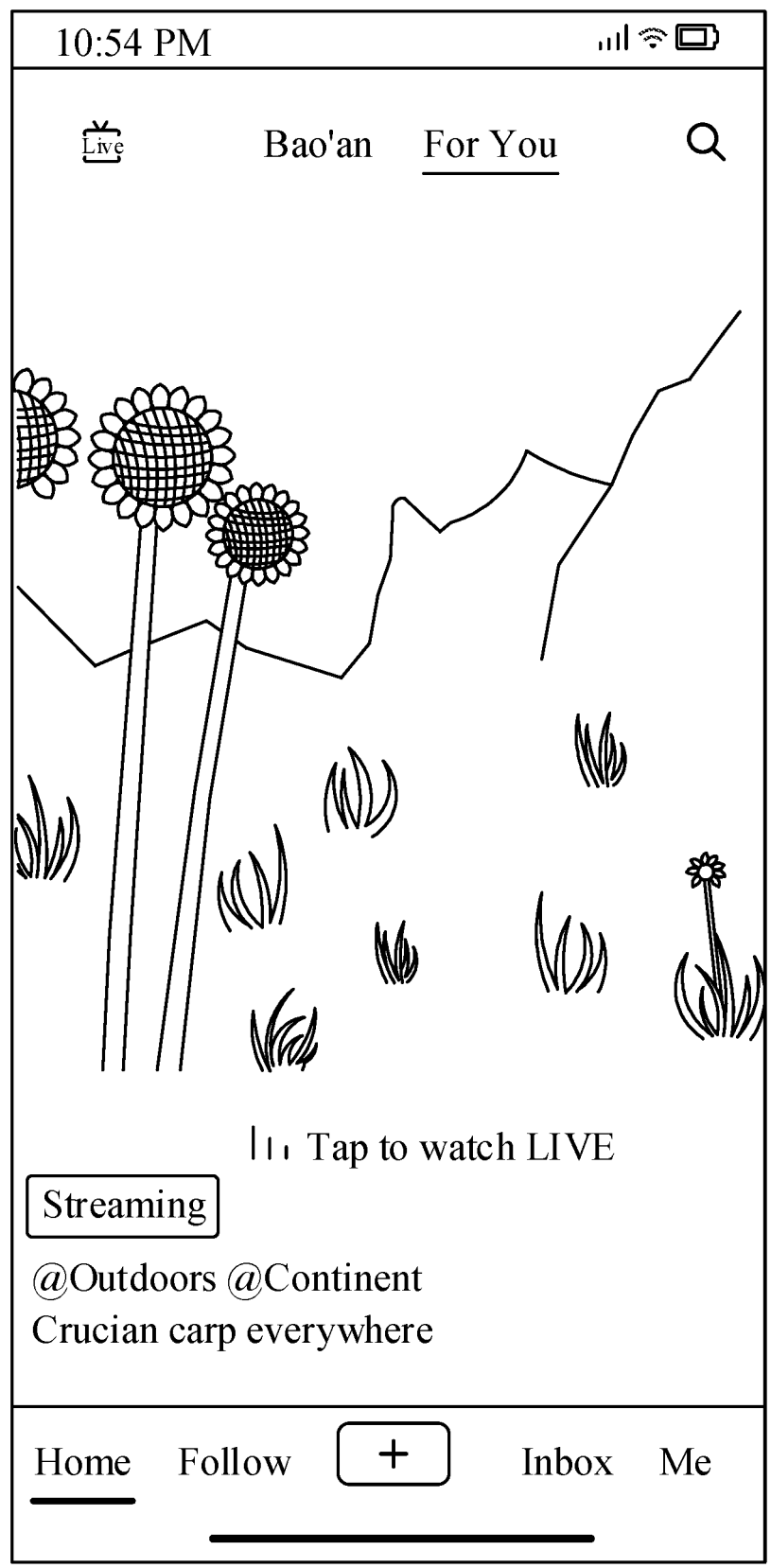
FIG. 1A and FIG. 1B are schematic diagrams of a livestreaming interface in a livestreaming processing method in the related art.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) Information flow: An information flow in the field of Internet is a channel and process of transferring content to a user through a network medium. The content is vertically arranged in a similar specification and format to form an information flow. The front page of a news client is an information flow.

2) Content Delivery Network (CDN): A CDN is an intelligent virtual network constructed based on an existing network. The CDN relies on edge servers deployed in different places and uses functional modules such as a load balancing module, a content delivery module, and a scheduling module of a central platform to allow a user to obtain required content locally, thereby reducing network congestion and improving the response speed and hit rate of user access. The key technologies of the CDN mainly include a content storage technology and a content delivery technology.

In a related technology, a livestreaming clip is directly placed in an information flow for display. A cover (picture and text information) of the livestreaming clip obtained according to a livestreamer type is displayed explicitly in the information flow. The content of the picture and text information is monotonous. However, the picture and text information mixed in the information flow tends to receive a tap operation of a user. The user can enter a livestreaming room in response to the tap operation of the user on the picture and text information. However, during the implementation of the embodiments of this application, the applicant finds that instead of truly knowing about livestreaming content, users enter a livestreaming room due to incorrect taps, resulting in a relatively high churn rate of the livestreaming room. In another related technology, a livestreaming platform generates a short video clip of a topic or a livestreamer in advance. In a case that livestreaming is started, the short video clip prepared in advance is placed in an information flow. However, it is difficult to make the content of a short video prepared in advance closely related to livestreaming content. As a result, server resources are excessively consumed, and it is difficult to produce a satisfying promotional effect.

Figure 1B:
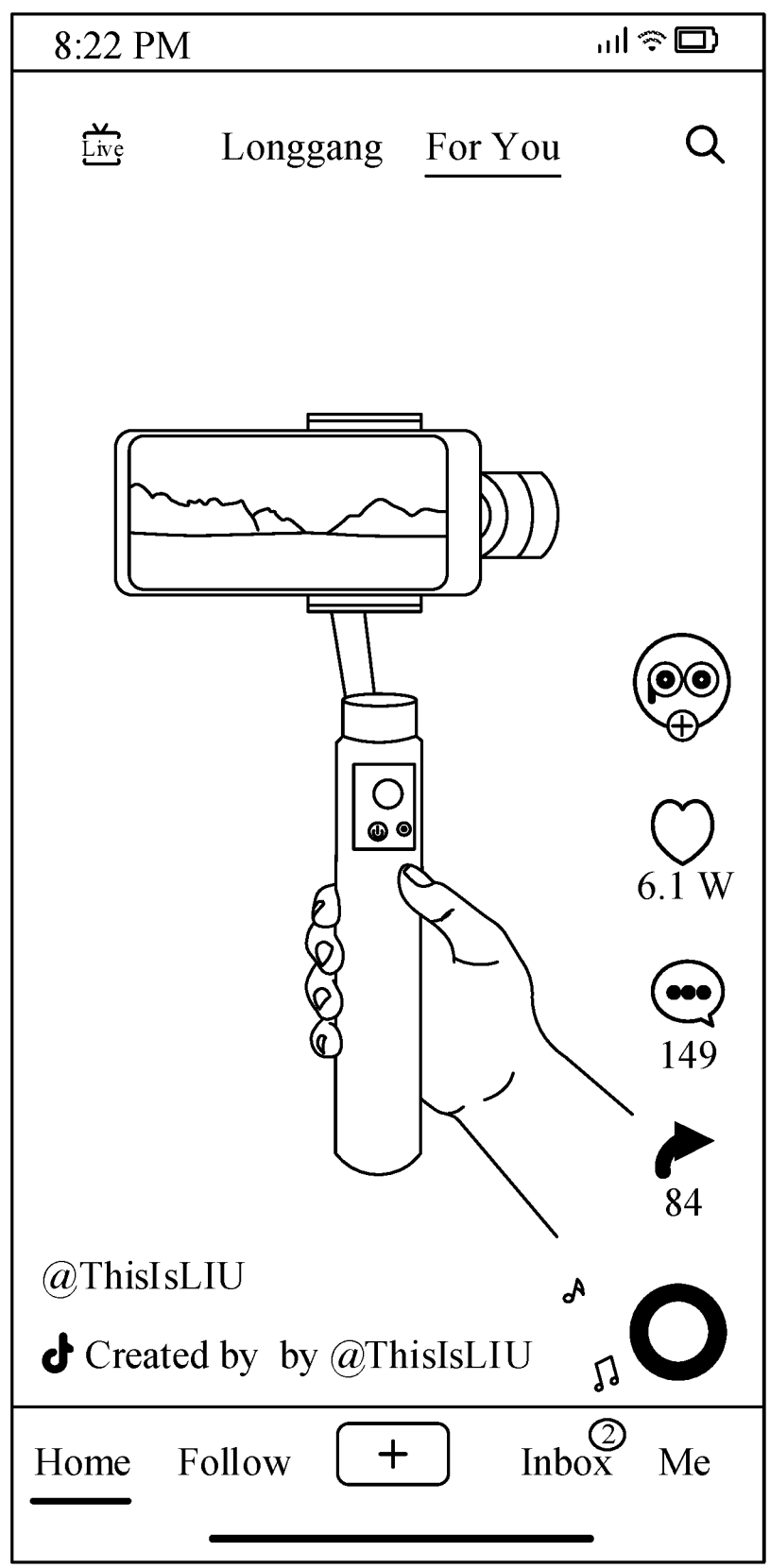

FIG. 1A is a schematic livestreaming diagram before livestreaming in a livestreaming processing method in the related art. FIG. 1B is a schematic livestreaming diagram during livestreaming in a livestreaming processing method in the related art. It is found very easily by comparing FIG. 1A with FIG. 1B that a livestreaming cover presented to users before livestreaming is completely different from livestreaming content. In FIG. 1A, the livestreaming cover for attracting users is a scene of a country path. The livestreaming content shown in FIG. 1B is seas and mountains. The two have a large difference and are distantly related. After entering a livestreaming room through the livestreaming cover for attracting users in FIG. 1A, users jump to livestreaming content that is not related or distantly related to the livestreaming cover, which reduces the visit retention rate of the livestreaming room.

The applicant finds during the implementation of the embodiments of this application that the foregoing technologies have the following disadvantages. The manner of directly placing a livestreaming clip is not very flexible. A livestreaming cover is displayed explicitly in an information flow. As a result, the content is relatively monotonous. Picture and text information mixed in the information flow tends to receive a tap operation of a user. The user can enter a livestreaming room in response to the tap operation of the user on the picture and text information. Although the click-through rate of a livestreaming room is increased on the surface, users enter the livestreaming room without deeply knowing about livestreaming content, which leads to a relatively high visit churn rate. In the manner of placing a preconfigured video clip, a short video of a livestreamer needs to be prepared in advance. Because it is very difficult to make a video clip prepared in advance closely related to livestreaming content, after watching the short video and entering a livestreaming room, a user may find that currently streaming content is not related to the content of the short video, which leads to a relatively high visit churn rate of the livestreaming room. Server resources are excessively consumed, and it is difficult to produce a satisfying promotional effect.

To resolve the foregoing technical problems, the embodiments of this application provide a livestreaming processing method and apparatus, an electronic device, and a computer-readable storage medium, which can resolve the problem of a relatively high visit churn rate of a livestreaming room, thereby improving the recommendation efficiency and the utilization of recommended resources. An exemplary application of an electronic device provided in the embodiments of this application is described below. The electronic device provided in the embodiments of this application may be implemented as user terminals of various types such as a notebook computer, a tablet computer, a desktop computer, a set top box, and a mobile device (for example, a mobile phone, a portable music player, a personal digital assistant, a dedicated message device, and a portable game device). An exemplary application of the device implemented as a livestreamer terminal is described below.

Figure 2:
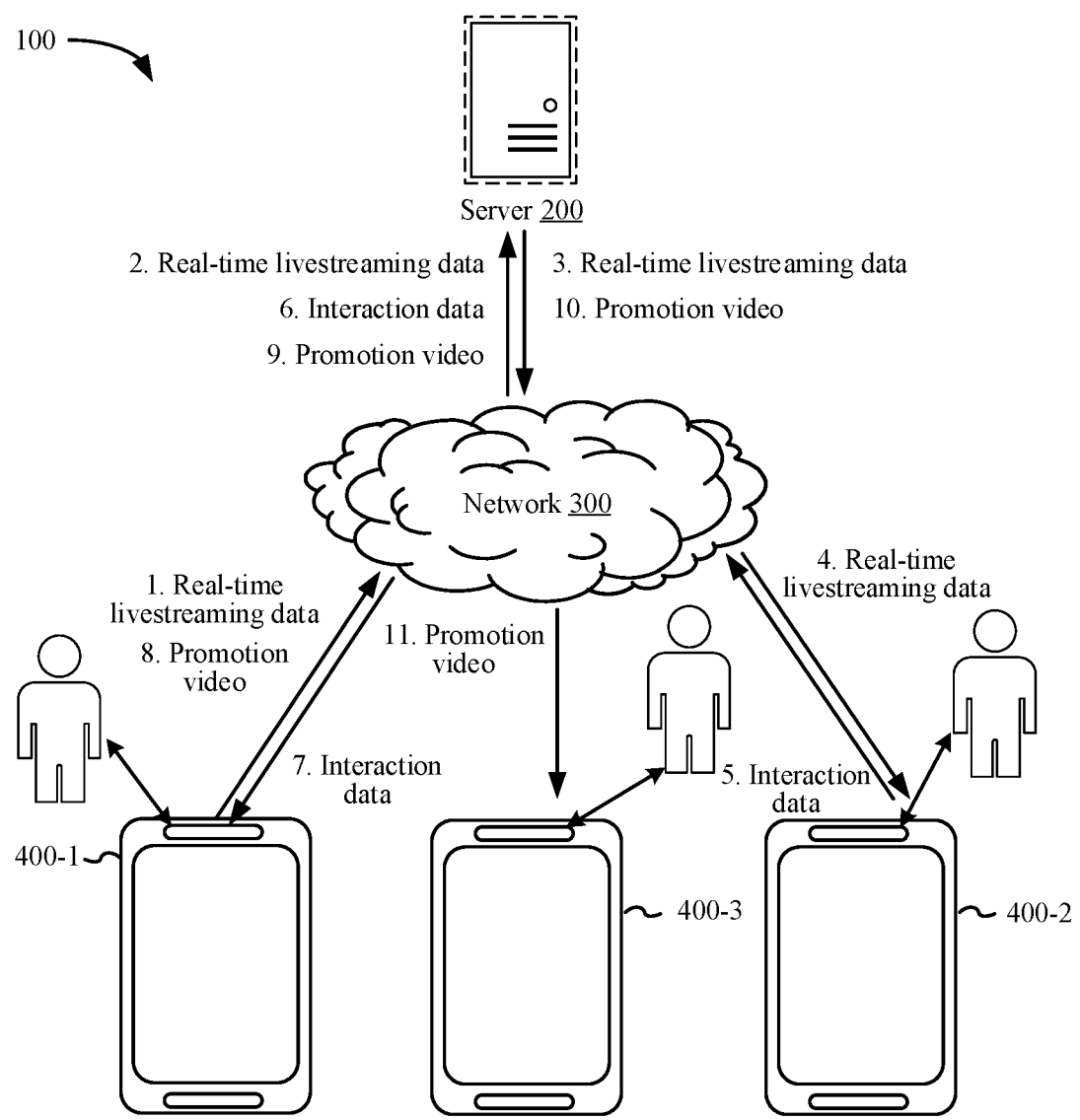
FIG. 2 is a schematic structural diagram of the architecture of a livestreaming processing system according to an embodiment of this application.

FIG. 2 is a schematic architectural diagram of a livestreaming processing system 100 according to an embodiment of this application. A terminal 400 (a livestreamer terminal 400-1, a viewer terminal 400-2, and an information flow terminal 400-3 are exemplarily shown) is connected to a server 200 by a network 300. The network 300 may be a wide area network, a local area network, or a combination of thereof.

During livestreaming, the livestreamer terminal 400-1 transmits real-time livestreaming data of a livestreaming room to the server 200. The server 200 synchronizes the real-time livestreaming data to various terminals (the livestreamer terminal 400-1, the viewer terminal 400-2, and the information flow terminal 400-3) in the livestreaming room. FIG. 2 shows that the real-time livestreaming data is synchronized to the viewer terminal 400-2. The viewer terminal 400-2 returns interaction data to the livestreamer terminal 400-1 through the server 200 and displays an interaction result on the livestreamer terminal 400-1. The livestreamer terminal 400-1 generates a score of corresponding livestreaming content according to the interaction data. In a case that the score exceeds a score threshold, the livestreamer terminal 400-1 automatically records the screen for the real-time livestreaming content to obtain a promotion video, and transmits the promotion video through to the information flow terminal 400-3 through the server 200, to allow a user of the information flow terminal 400-3 to jump to the livestreaming room of the livestreamer through a trigger operation on the promotion video and allow the information flow terminal to display the livestreaming content like the viewer terminal 400-2.

In some embodiments, the server 200 may be an independent physical server, or may be a server cluster or a distributed system formed by a plurality of physical servers, or may be a cloud server providing basic cloud computing services, such as a cloud service, a cloud database, cloud computing, a cloud function, cloud storage, a network service, cloud communication, a middleware service, a domain name service, a security service, a CDN, and a big data and artificial intelligence platform. The terminal 400 may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in the embodiments of the present application.

Figure 3:
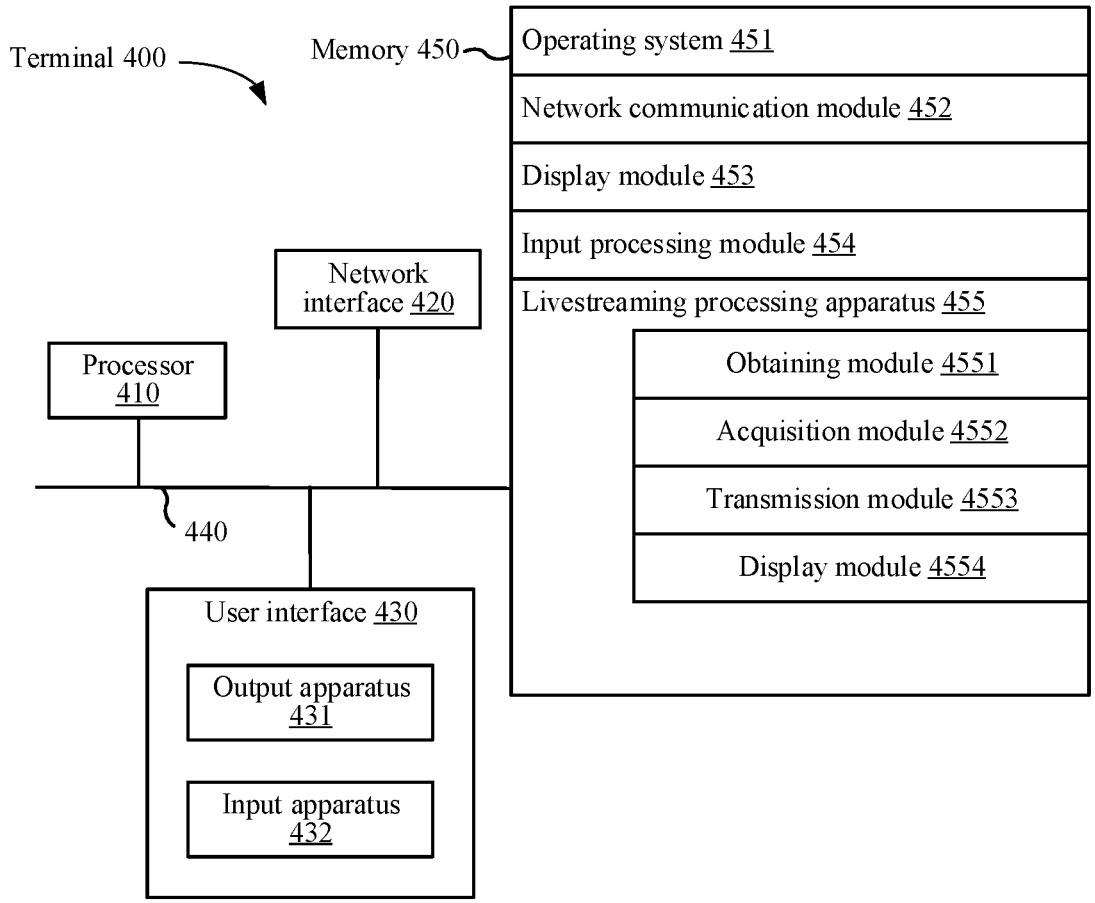
FIG. 3 is a schematic structural diagram of a terminal to which a livestreaming processing method is applied according to an embodiment of this application.

FIG. 3 is a schematic structural diagram of a terminal 400 to which a livestreaming processing method is applied according to an embodiment of this application. The terminal 400 shown in FIG. 3 includes at least one processor 410, a memory 450, at least one network interface 420, and a user interface 430. All the components in the terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 3.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input buttons and controls.

The memory 450 may be a removable memory, a non-removable memory, or a combination thereof. Exemplary hardware devices include a solid-state memory, a hard disk drive, an optical disc driver, or the like. The memory 450 includes one or more storage devices that are physically away from the processor 410.

The memory 450 includes a volatile memory or a non-volatile memory, or may include a volatile memory and a non-volatile memory. The non-volatile memory may be a read-only memory (ROM), and the volatile memory may be a random access memory (RAM). The memory 450 described in this embodiment of this application is to include any other suitable type of memories.

In some embodiments, the memory 450 may store data to support various operations. Examples of the data include programs, modules, and data structures, or a subset or a superset thereof, which are illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, Wireless Fidelity (Wi-Fi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the livestreaming processing apparatus provided in this embodiment of this application may be implemented by using software. FIG. 3 shows a livestreaming processing apparatus 455 in a virtual scene stored in the memory 450. The apparatus may be software in a form such as a program and a plug-in, and includes the following software modules: an obtaining module 4551, an acquisition module 4552, a transmission module 4553, and a display module 4554. These modules are logical modules, and may be combined in different manners or further divided based on a function to be performed. The following describes a function of each module.

The livestreaming processing method provided in the embodiments of this application is described below with reference to the exemplary application and implementation of the terminal provided in the embodiments of this application.

Figure 4A:
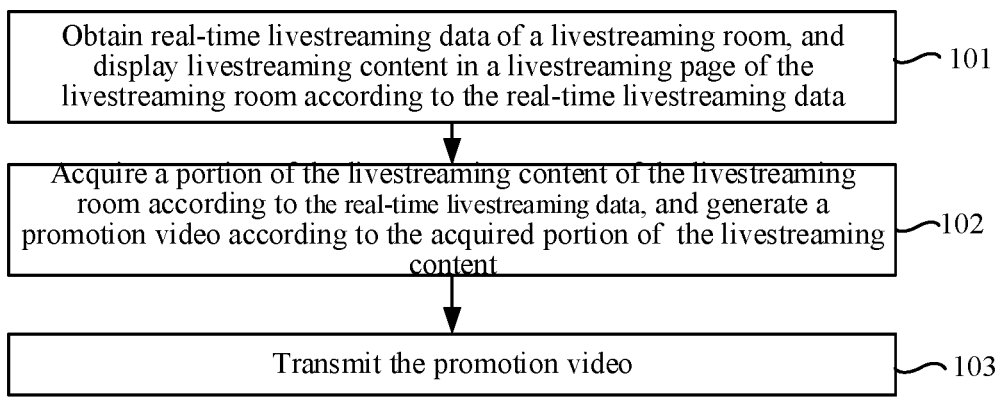
FIG. 4A to FIG. 4E are schematic flowcharts of a livestreaming processing method according to an embodiment of this application.

FIG. 4A is a schematic flowchart of a livestreaming processing method according to an embodiment of this application. Steps 101 to 103 shown in FIG. 4A are described.

Step 101: Obtain real-time livestreaming data of a livestreaming room, and display livestreaming content in a livestreaming page of the livestreaming room according to the real-time livestreaming data.

In an example, the real-time livestreaming data may be obtained by a terminal acquiring the performance of a livestreamer. For example, the real-time livestreaming data is shooting data of the livestreamer, and then the livestreaming content is displayed in the livestreaming room according to the real-time livestreaming data.

Step 102: Acquire a portion of the livestreaming content of the livestreaming room according to the real-time livestreaming data, and generate a promotion video according to the acquired portion of the livestreaming content.

In an example, the livestreaming content in the livestreaming room includes at least one of the following: real-time livestreaming content, historical livestreaming content that belongs to the same livestream session as the real-time livestreaming content, and historical livestreaming content that belongs to a different livestream session from the real-time livestreaming content. For the historical livestreaming content that belongs to a different livestream session from the real-time livestreaming content, the historical livestreaming content and the real-time livestreaming content of the livestreaming room belong to the same topic. For example, the real-time livestreaming content of the livestreaming room is selling women's clothes of a brand A, and the historical livestreaming content is also selling women's clothes of the brand A. That is, the historical livestreaming content and the real-time livestreaming content of the livestreaming room belong to the same topic.

Figure 4B:
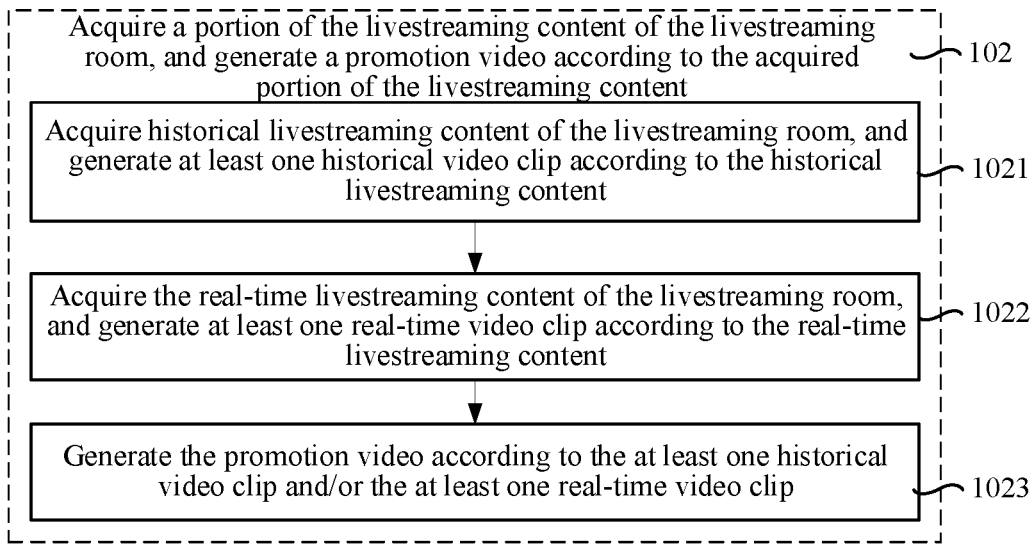

FIG. 4B is a schematic flowchart of a livestreaming processing method according to an embodiment of this application. Steps 1021 to 1023 shown in FIG. 4B are described. The acquiring a portion of the livestreaming content of the livestreaming room according to the real-time livestreaming data to generate the promotion video in step 102 may be implemented by using steps 1021 to 1023.

Step 1021: Acquire historical livestreaming content of the livestreaming room, and generate at least one historical video clip according to the historical livestreaming content, the historical livestreaming content and real-time livestreaming content of the livestreaming room belonging to the same livestream session or the historical livestreaming content and real-time livestreaming content of the livestreaming room belonging to the same topic.

Step 1022: Acquire the real-time livestreaming content of the livestreaming room, and generate at least one real-time video clip according to the real-time livestreaming content.

In an example, the real-time livestreaming content is content played synchronously in livestreaming obtained after a current acquisition operation is triggered, that is, data streamed by a server in real time after the acquisition operation is triggered (the streamed data is obtained by decoding and encoding a current livestream). The historical livestreaming content is livestreaming content obtained before the acquisition operation is triggered, that is, content obtained by searching a film library request.

In an example, the historical livestreaming content and the real-time livestreaming content may belong to different livestream sessions, and a difference between the sessions is less than a session difference threshold, or the historical livestreaming content and the real-time livestreaming content belong to different livestream sessions, and a difference between streaming time is less than a time difference threshold. In this case, the obtained historical livestreaming content and the real-time livestreaming content have close sessions or have close streaming time. Therefore, the obtained livestreaming content has a close correlation and reference significance and may be used as a material for a promotion video of current livestreaming.

In an example, the acquisition may be implemented through two implementations. The first implementation is an implementation of screen recording. That is, a screen recording interface of a system is invoked to record content displayed on a client, and a video clip is generated. In the second implementation, a media data stream is obtained to generate a video clip. Specifically, during livestreaming, the server pushes a livestreaming data stream to the client. The client caches the livestreaming data stream using cache-aside, and encapsulates the cached livestreaming data stream into a file of the video clip.

Step 1023: Generate the promotion video according to the at least one historical video clip and/or the at least one real-time video clip.

In an example, a play duration of the promotion video is any value, or a play duration of the promotion video needs to satisfy a required duration. The required duration includes a minimum duration. That is, an actual play duration of the promotion video is not less than the minimum duration. The required duration further includes a maximum duration. That is, an actual play duration of the promotion video is not greater than the maximum duration. The required duration further includes a duration interval. That is, an actual play duration of the promotion video is within the duration interval. The required duration further includes a play duration. That is, an actual play duration of the promotion video is identical with the play duration.

In some embodiments, the acquiring historical livestreaming content of the livestreaming room according to the real-time livestreaming data, and generate at least one historical video clip according to the historical livestreaming content in step 1021 may be implemented by the following technical solution: performing at least one of the following operations: cutting at least one historical video clip with a score exceeding a score threshold from the historical livestreaming content; and cutting, in response to a cutting operation on the historical livestreaming content, at least one historical video clip from the historical livestreaming content according to a cutting starting point and a cutting end point, the cutting starting point and the cutting end point being set based on the cutting operation.

In an example, when the length of the historical video clip obtained through the cutting operation is set to a fixed value, a cutting time point includes a cutting starting point, a cutting midpoint or a cutting end point of the historical video clip. In a case that the length of the historical video clip obtained through the cutting operation is not set to a fixed value, that is, when the length of the historical video clip obtained through the cutting operation is a dynamic value, a cutting time point may include a cutting starting point and a cutting end point of the historical video clip, thereby flexibly adapting to various cutting manners.

In an example, when the length of the historical video clip obtained through the cutting operation is set to a fixed value, a cutting time point includes a cutting starting point, a cutting midpoint or a cutting end point of the historical video clip. In a case that the cutting time point is a cutting starting point, a sum of the cutting starting point and the fixed value is a cutting end point, so that the historical livestreaming content is cut based on the cutting starting point and the cutting end point. In a case that the cutting time point is a cutting midpoint, a sum of the cutting midpoint and a half of the fixed value is a cutting end point, and a difference between the cutting midpoint and the half of the fixed value is a cutting starting point, so that the historical livestreaming content is cut based on the cutting starting point and the cutting end point. In a case that the cutting time point is a cutting end point, a difference between the cutting end point and the fixed value is a cutting starting point, so that the historical livestreaming content is cut based on the cutting starting point and the cutting end point.

In an example, the cutting operation may trigger one cutting or may trigger a plurality of cuttings. In a case that the cutting operation only triggers one cutting, in response to a group of a cutting starting point and a cutting end point set in the cutting operation, cutting is performed to obtain one historical video clip. Alternatively, in response to a plurality of groups of a cutting starting point and a cutting end point set in the cutting operation, cutting is performed to obtain a historical video clip that separately corresponds to each group of a cutting starting point and a cutting end point, that is, obtain a plurality of historical video clips. In a case that the cutting operation triggers a plurality of cuttings, in response to each cutting operation, cutting may be performed to obtain one historical video clip or a plurality of historical video clips.

In some embodiments, the cutting at least one historical video clip with a score exceeding a score threshold from the historical livestreaming content may be implemented by using the foregoing technical solution: performing a sliding window operation on a time axis of the historical livestreaming content according to a particular step size, a time period in a sliding window being referred to as a sampling window duration; obtaining interaction data corresponding to the historical livestreaming content within each sampling window duration, a livestreamer image display area corresponding to the historical livestreaming content within the each sampling window duration, and a livestreaming class to which the historical livestreaming content belongs; determining a score of the historical livestreaming content within the each sampling window duration according to the interaction data, the livestreamer image display area, and the livestreaming class; and forming at least one historical video clip according to historical livestreaming content with a score exceeding the score threshold within at least one sampling window duration.

In an example, livestreaming content in each sampling window duration may form one historical video clip, or livestreaming content in a plurality of sampling window durations is synthesized into one historical video clip.

In some embodiments, the cutting at least one historical video clip with a score exceeding a score threshold from the historical livestreaming content may be implemented by using the foregoing technical solution: cutting, in response to a cutting trigger operation (for example, one-tap cutting of historical livestreaming content) on the historical livestreaming content, at least one historical video clip with a score exceeding a score threshold from the historical livestreaming content; or the cutting at least one historical video clip with a score exceeding a score threshold from the historical livestreaming content may be implemented by using the foregoing technical solution: automatically cutting at least one historical video clip with a score exceeding a score threshold from the historical livestreaming content.

In an example, during cutting of the historical livestreaming content, cutting may be performed in response to an operation of a user or cutting may be automatically performed without intervention of a user. For example, scores at time points are displayed, so that cutting is performed with the user knowing the score at each time point, thereby ensuring that a score of historical livestreaming content in at least one historical video clip obtained based on the cutting trigger operation exceeds the score threshold. For example, the scores at the time points are hidden, and cutting is automatically performed according to the score at each time point without the perception of a user, thereby improving the efficiency of human-computer interaction.

In an example, each time point at which the historical livestreaming content is played is obtained by dividing a time axis of livestreaming according to a particular granularity. Different granularities are set according to the requirement of overall scoring accuracy. The overall scoring accuracy is higher when the granularity is smaller. For example, the overall scoring accuracy obtained when the granularity is one second is greater than the overall scoring accuracy obtained when the granularity is one minute. In a case that the granularity is two seconds, for each time point of playing the historical livestreaming content, a score of the historical livestreaming content of the livestreaming room is determined.

In some embodiments, the determining a score of the historical livestreaming content within the each sampling window duration according to the interaction data, the livestreamer image display area, and the livestreaming class may be implemented by using the foregoing technical solution: obtaining an initial score corresponding to the livestreaming class and a portrait score corresponding to the livestreamer image display area; multiplying scores of interaction data of each type and interaction data of a corresponding type to obtain a popularity score corresponding to the interaction data; and adding the initial score, the portrait score, and the popularity score to obtain the score of the historical livestreaming content within the each sampling window duration.

In an example, the same scoring principle is used in the livestreaming processing method provided in the embodiments of this application. The scoring process may be implemented on a client, or a server may be invoked to provide an interface for a computing service to use computing resources of the server to implement scoring. Information sources for scoring include livestreaming type data, interaction data, and data of a livestreamer image display area. A backend server obtains interaction data of viewer clients, obtains data of a livestreamer image display area uploaded by a livestreamer client, and livestreaming type data uploaded by the livestreamer client to perform score calculation. Alternatively, a backend server obtains interaction data of viewer clients and returns the interaction data to a livestreamer client. The livestreamer client performs score calculation by combining the interaction data, data of a livestreamer image display area, and livestreaming type data.

In an example, the client uploads data of comments, shopping, and tips in a livestreaming room to the backend server. The backend server generates a popularity score according to the data. After livestreaming is started, the client collects the data of comments, the data of shopping, and the data of tips and gifts in the livestreaming room periodically (for example, every second), and uploads the data and timestamps at which the data is generated to the backend server. The backend server records the data and generates the popularity score of the livestreaming room in combination with a face recognition result. The principle of generating a popularity score is as follows: a popularity score of a livestreaming room=an initial score+a popularity score generated through user interaction (comments, shopping, and tips)+a portrait score. After livestreaming is started, an initial score is assigned to a current livestream session. In this case, the livestream session enters a recommendation list for ranking. Different initial scores are assigned to different livestreaming types. For example, face attractiveness livestreaming, talent livestreaming, game livestreaming, dance livestreaming, and campus livestreaming have different initial scores. An initial score assignment module assigns initial scores according to weights of attention of viewers on a platform. The initial score is set to a variable. For example, S0 (face attractiveness)=1.4*S0, S0 (sing)=1.2*S0, S0 (dance)=1.2*S0, S0 (campus)=1.0*S0, and S0 (game)=0.8*S0. As visiting users enter a livestreaming room, commenting behavior, shopping behavior, and tipping behavior, and the like of the users are considered to help to increase the popularity of the livestream session. The interaction behavior of users in the livestreaming room includes the following four types of behavior: watching behavior of the users entering the room, commenting behavior, shopping behavior, and tipping behavior. A real-time popularity score generated from user interaction in the livestreaming room can be obtained by assigning scores to different behavior. The scores assigned to different behavior are, for example, 1, 5, 10, and 20 respectively. The rule for the popularity score generated from user interaction is variable. In a case that the scale of users is small (a quantity of users is less than a user scale threshold), in this case, a behavior score (a behavior score corresponding to the quantity of users) of each event needs to be increased, thereby improving the influence of user behavior. In a case that the scale of users increases (the quantity of users is not less than the user scale threshold), the behavior score (the behavior score corresponding to the quantity of users) of each event is also to be increased. In this way, it is ensured that for different scales of users, the popularity score generated from user interaction remains basically stable. The popularity score generated from user interaction is as follows. S=(1*the watching behavior+5*the commenting behavior+10*the shopping behavior+20*the tipping behavior)/DAU*N, where DAU is a quantity of daily active users, and N is a fixed value, and is a quantity of times of categorizing the watching behavior, the commenting behavior, the shopping behavior, and the tipping behavior. For the portrait score, a display interface of the client displays a recommended face position in livestreaming. In response to detecting that the face of a livestreamer is within the recommended face position, the portrait score is 10, and a duration is s1 (a duration for which the face of the livestreamer is within the recommended face position). In response to detecting that the face of a livestreamer is not within the recommended face position, the portrait score is 5, and a duration is s2 (a duration for which the face of the livestreamer is not within the recommended face position). The portrait score is calculated as follows: S=10*s1−5*s2.

In some embodiments, the acquiring the real-time livestreaming content of the livestreaming room according to the real-time livestreaming data, and generating at least one real-time video clip according to the real-time livestreaming content in step 1022 may be implemented by using the foregoing technical solution: acquiring a portion of the livestreaming content of the livestreaming room according to the real-time livestreaming data in real time within a preset sampling window duration in response to a promotion video acquisition operation, and generating a corresponding real-time video clip according to the real-time livestreaming content acquired within the sampling window duration; and filtering out a real-time video clip with a score less than a score threshold from a plurality of generated real-time video clips to obtain the at least one real-time video clip.

In some embodiments, the acquiring the real-time livestreaming content of the livestreaming room according to the real-time livestreaming data, and generating at least one real-time video clip according to the real-time livestreaming content in step 1022 may be implemented by using the foregoing technical solution: determining a score of the real-time livestreaming content of the livestreaming room for each time point of real-time playing; and starting to acquire the real-time livestreaming content of the livestreaming room with a time point at which the score of the real-time livestreaming content exceeds a score threshold as a starting point, and generating the at least one real-time video clip.

In an example, each time point of real-time playing is played is obtained by dividing a time axis of livestreaming according to a particular granularity. Different granularities are set according to the requirement of real-time performance. The real-time performance is higher when the granularity is smaller. For example, the real-time performance obtained when the granularity is one second is greater than the real-time performance obtained when the granularity is one minute. In a case that the granularity is two seconds, a score of the real-time content of the livestreaming room is determined for each time point of real-time playing. Specifically, the implementation may be performed in the following manner. Comments, shopping, and tipping data (interaction data) of livestreaming content within a period of two seconds starting from the receiving of the acquisition operation are uploaded to the server. The server generates a score according to the interaction data and returns the score to the client. Alternatively, the client has sufficient computing resources, and the client directly generates a score according to the interaction data. For the source of the interaction data, the viewer clients may directly transmit the interaction data to the server for the server to perform corresponding calculation. Alternatively, the viewer clients transmit the interaction data to the server, and the server returns the interaction data to the livestreamer client. The livestreamer client directly performs calculation or returns the interaction data and the livestreamer image display area together to the server for calculation.

In some embodiments, the determining a score of the real-time livestreaming content of the livestreaming room may be implemented by using the foregoing technical solution: obtaining interaction data of the real-time livestreaming content at each time point, a livestreamer image display area at each time point, and a livestreaming class to which the real-time livestreaming content belongs at each time point. obtaining an initial score corresponding to the livestreaming class and a portrait score corresponding to the livestreamer image display area; multiplying scores of interaction data of each type and interaction data of a corresponding type to obtain a popularity score corresponding to the interaction data; and adding the initial score, the portrait score, and the popularity score to obtain a score of the real-time livestreaming content at each time point.

In an example, the interaction data includes data of comments, shopping, tips, and the like in the livestreaming room. The client uploads the interaction data to the backend server. The backend server generates a popularity score according to the data. After livestreaming is started, the client collects the interaction data in the livestreaming room periodically (for example, every second), and uploads the interaction data and timestamps at which the interaction data is generated to the backend server. The backend server records the data and generates the popularity score of the livestreaming room in combination with a face recognition result. The principle of generating a popularity score is as follows: a popularity score of a livestreaming room=an initial score+a popularity score generated through user interaction (data of comments, data of shopping, and data of tips)+a portrait score. After livestreaming is started, an initial score is assigned to a current livestream session. In this case, the livestream session enters a recommendation list for sorting. Different initial scores are assigned to different livestreaming types. For example, face attractiveness livestreaming, talent livestreaming, game livestreaming, dance livestreaming, and campus livestreaming have different initial scores. An initial score assignment module assigns initial scores according to weights of attention of viewers on a platform. The initial score is set to a variable. For example, S0 (face attractiveness)=1.4*S0, S0 (sing)=1.2*S0, S0 (dance)=1.2*S0, S0 (campus)=1.0*S0, and S0 (game)=0.8*S0. As visiting users enter a livestreaming room, commenting behavior, shopping behavior, and tipping behavior, and the like of the users are considered to help to increase the popularity of the livestream session. The interaction behavior of users in the livestreaming room includes the following four types of behavior: watching behavior of the users entering the room, commenting behavior, shopping behavior, and tipping behavior. A real-time popularity score generated from user interaction in the livestreaming room can be obtained by assigning scores to different behavior. The scores assigned to different behavior are, for example, 1, 5, 10, and 20 respectively. The rule for the popularity score generated from user interaction is variable. In a case that the scale of users is small (a quantity of users is less than a user scale threshold), in this case, a behavior score (a behavior score corresponding to the quantity of users) of each event needs to be increased, thereby improving the influence of user behavior. In a case that the scale of users increases (the quantity of users is not less than the user scale threshold), the behavior score (the behavior score corresponding to the quantity of users) of each event is also to be increased. In this way, it is ensured that for different scales of users, the popularity score generated from user interaction remains basically stable. The popularity score generated from user interaction is as follows. S=(1*the watching behavior+5*the commenting behavior+10*the shopping behavior+20*the tipping behavior)/DAU*N, where DAU is a quantity of daily active users, and N is a fixed value, and is a quantity of times of categorizing the watching behavior, the commenting behavior, the shopping behavior, and the tipping behavior. For the portrait score, a display interface of the client displays a recommended face position in livestreaming. In response to detecting that the face of a livestreamer is within the recommended face position, the portrait score is 10, and a duration is s1 (a duration for which the face of the livestreamer is within the recommended face position). In response to detecting that the face of a livestreamer is not within the recommended face position, the portrait score is 5, and a duration is s2 (a duration for which the face of the livestreamer is not within the recommended face position). The portrait score is calculated as follows: S=10*s1−5*s2.

In some embodiments, the starting to acquire the real-time livestreaming content of the livestreaming room with a time point at which the score of the real-time livestreaming content exceeds a score threshold as a starting point, and generating the at least one real-time video clip according to the acquired real-time livestreaming content may be implemented by using the foregoing technical solution: starting to acquire the real-time livestreaming content of the livestreaming room with the time point at which the score of the real-time livestreaming content exceeds the score threshold as the starting point, and stopping the acquisition when the acquisition reaches a time point at which a minimum required duration of the promotion video is satisfied; and generating the at least one real-time video clip according to acquired real-time livestreaming content (that is, real-time livestreaming content between the starting point and an end point).

In an example, the real-time livestreaming content of the livestreaming room starts to be acquired with the time point at which the score of the real-time livestreaming content exceeds the score threshold as the starting point, and the acquisition is stopped when the acquisition reaches a time point at which a minimum required duration of the promotion video is satisfied, to use the time point at which the acquisition is stopped as the end point. The at least one real-time video clip is generated according to the acquired real-time livestreaming content (that is, the real-time livestreaming content between the starting point and the end point). The score of the real-time livestreaming content is used for locating an acquisition starting point, and it is not taken into consideration whether subsequently the score exceeds the score threshold during the acquisition. Through the foregoing implementation, one real-time video clip only needs to be scored once, thereby effectively reducing the occupancy of computing resources.

In some embodiments, the starting to acquire the real-time livestreaming content of the livestreaming room with a time point at which the score of the real-time livestreaming content exceeds a score threshold as a starting point, and generating the at least one real-time video clip according to the real-time livestreaming content may be implemented by using the foregoing technical solution: starting to acquire the real-time livestreaming content of the livestreaming room with the time point at which the score of the real-time livestreaming content exceeds the score threshold as the starting point; when scores of the real-time livestreaming content at all time points within a minimum required duration exceed the score threshold, continuing to acquire the real-time livestreaming content of the livestreaming room, and stopping the acquisition when the acquisition reaches a time point at which a score of the real-time livestreaming content does not exceed the score threshold, to use the time point at which the acquisition is stopped as the end point; and generating the at least one real-time video clip according to real-time livestreaming content acquired between the starting point and an end point, the minimum required duration being counted starting from the starting point.

In an example, the real-time livestreaming content of the livestreaming room starts to be acquired with the time point at which the score of the real-time livestreaming content exceeds the score threshold as the starting point; when scores of the real-time livestreaming content at all time points within a minimum required duration exceed the score threshold, the real-time livestreaming content of the livestreaming room continues to be acquired, and the acquisition is stopped when the acquisition reaches a time point at which a score of the real-time livestreaming content does not exceed the score threshold, to use the time point at which the acquisition is stopped as the end point; and the at least one real-time video clip is generated according to real-time livestreaming content acquired between the starting point and an end point, the minimum required duration being counted starting from the starting point. All time points within the minimum required duration are time points with a score within the minimum required duration. In a case that scores of the real-time livestreaming content at all the time points exceed the score threshold, it represents that a score of the real-time livestreaming content corresponding to each time point with a score exceeds the score threshold. Real-time livestreaming content that is acquired each time and satisfies the minimum required duration is used to form one real-time video clip, so that video clips that are acquired a plurality of times and satisfy the minimum required duration may form a plurality of real-time video clips. Real-time livestreaming content that is acquired each time and satisfies the minimum required duration may be used to form a plurality of real-time video clips. For example, a half duration of the minimum required duration is used as a cutting point for cutting the real-time video clip, and real-time livestreaming content of 10 seconds (the minimum required duration) is acquired. Five seconds is used as cutting point to obtain two real-time video clips. In the foregoing implementation, it is ensured that scores of all real-time livestreaming content in obtained real-time video clips exceed a score threshold, so that the quality of generated real-time video clips is effectively improved, thereby helping to improve the recommendation efficiency.

In some embodiments, the starting to acquire the real-time livestreaming content of the livestreaming room with a time point at which the score of the real-time livestreaming content exceeds a score threshold as a starting point, and generating the at least one real-time video clip according to the real-time livestreaming content may be implemented by using the foregoing technical solution: starting to acquire the real-time livestreaming content of the livestreaming room with the time point at which the score of the real-time livestreaming content exceeds the score threshold as the starting point, and stopping the acquisition when the acquisition reaches a time point at which a maximum required duration of the promotion video is satisfied, to use a time point at which the acquisition is stopped as the end point; and The at least one real-time video clip is generated according to the acquired real-time livestreaming content (that is, the real-time livestreaming content between the starting point and the end point). The content within the maximum required duration may be used for generating one real-time video clip. A plurality of real-time video clips may be formed by repeating the foregoing steps. In the foregoing implementation, it is ensured that scores of all real-time livestreaming content in obtained real-time video clips exceed a score threshold, so that the quality of generated real-time video clips is effectively improved, and through repeated acquisition, the richness of real-time video clips is improved, thereby helping to improve the recommendation efficiency.

Figure 5A:
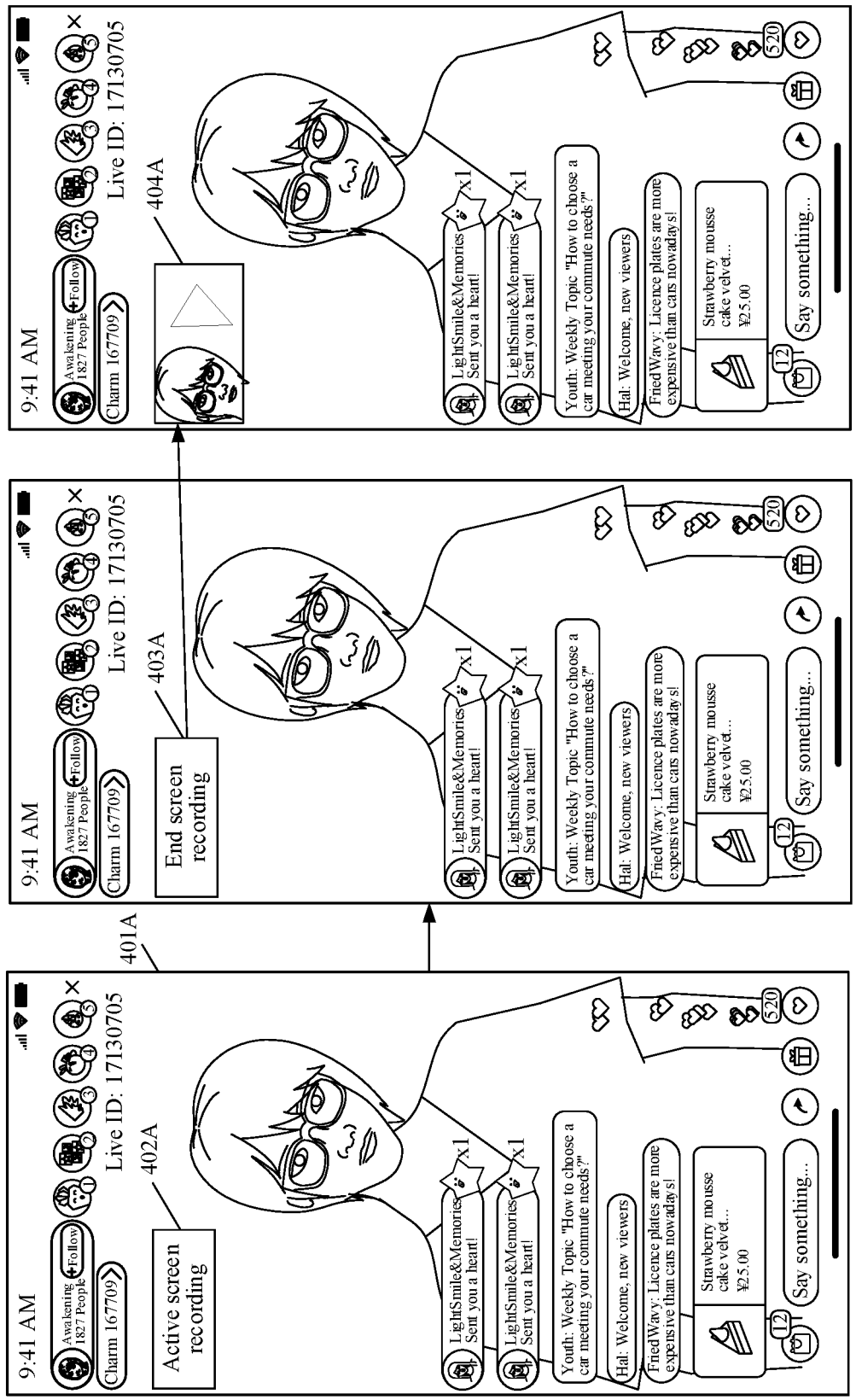
FIG. 5A and FIG. 5B are schematic flowcharts of an interface of a livestreaming processing method according to an embodiment of this application.

FIG. 5A is a schematic diagram of an interface of a livestreaming processing method according to an embodiment of this application. A trigger operation on an active screen recording control 402A is received in a livestreaming page 401A to start one-tap automatic screen recording, a trigger operation on an end screen recording control 403A is received in the livestreaming page 401A to end screen recording, and a generated real-time video clip 404A is displayed in the livestreaming page 401A.

In some embodiments, the starting to acquire the real-time livestreaming content of the livestreaming room with a time point at which the score of the real-time livestreaming content exceeds a score threshold as a starting point, and generating the at least one real-time video clip may be implemented by using the foregoing technical solution: starting to acquire the real-time livestreaming content of the livestreaming room with the time point at which the score of the real-time livestreaming content exceeds the score threshold as the starting point, and stopping the acquisition when the score of the real-time livestreaming content does not exceed the score threshold; starting to acquire the real-time livestreaming content of the livestreaming room with the time point at which the score of the real-time livestreaming content exceeds the score threshold again as a new starting point, and stopping the acquisition when accumulated acquired real-time livestreaming content satisfies a required duration of the promotion video or the score of the real-time livestreaming content does not exceed the score threshold; and generating the at least one real-time video clip according to the acquired real-time livestreaming content.

In an example, the time point at which the acquisition is stopped is used as the end point. The real-time livestreaming content between the starting point and the end point may be used for forming one clip. The foregoing steps are repeated to determine a new starting point and a new end point, so that a plurality of real-time video clips may be generated. The real-time livestreaming content between the end point of each starting point and the starting point may be used for generating one real-time video clip. The new starting point and the new end point determined again are used to generate another real-time video clip.

In an example, one corresponding real-time video clip may be generated each time the acquisition is stopped. Alternatively, when accumulatively acquired real-time livestreaming content satisfies a required duration of the promotion video, the accumulatively acquired real-time livestreaming content is synthesized into one real-time video clip.

In some embodiments, when a plurality of video clips are generated through acquisition, the generating the promotion video according to the video clips may be implemented by using the foregoing technical solution: in response to a video clip selection operation of a livestreamer account, sorting video clips selected by the video clip selection operation and synthesizing the video clips into the promotion video, the video clips generated through acquisition including a historical video clip and/or a real-time video clip, the manner of sorting including: a chronological order in which the video clips are selected; a chronological order in which the video clips are played in the livestreaming room; and a descending order of scores of the video clips.

In some embodiments, when a plurality of video clips are generated through acquisition, the generating the promotion video according to the video clips may be implemented by using the foregoing technical solution: sorting all video clips generated through acquisition, and selecting a plurality of video clips sorted at the top to synthesize the video clips into the promotion video, the video clips generated through acquisition including a historical video clip and/or a real-time video clip, the manner of sorting including: a chronological order in which the video clips are selected; a chronological order in which the video clips are played in the livestreaming room; and a descending order of scores of the video clips.

Figure 5B:
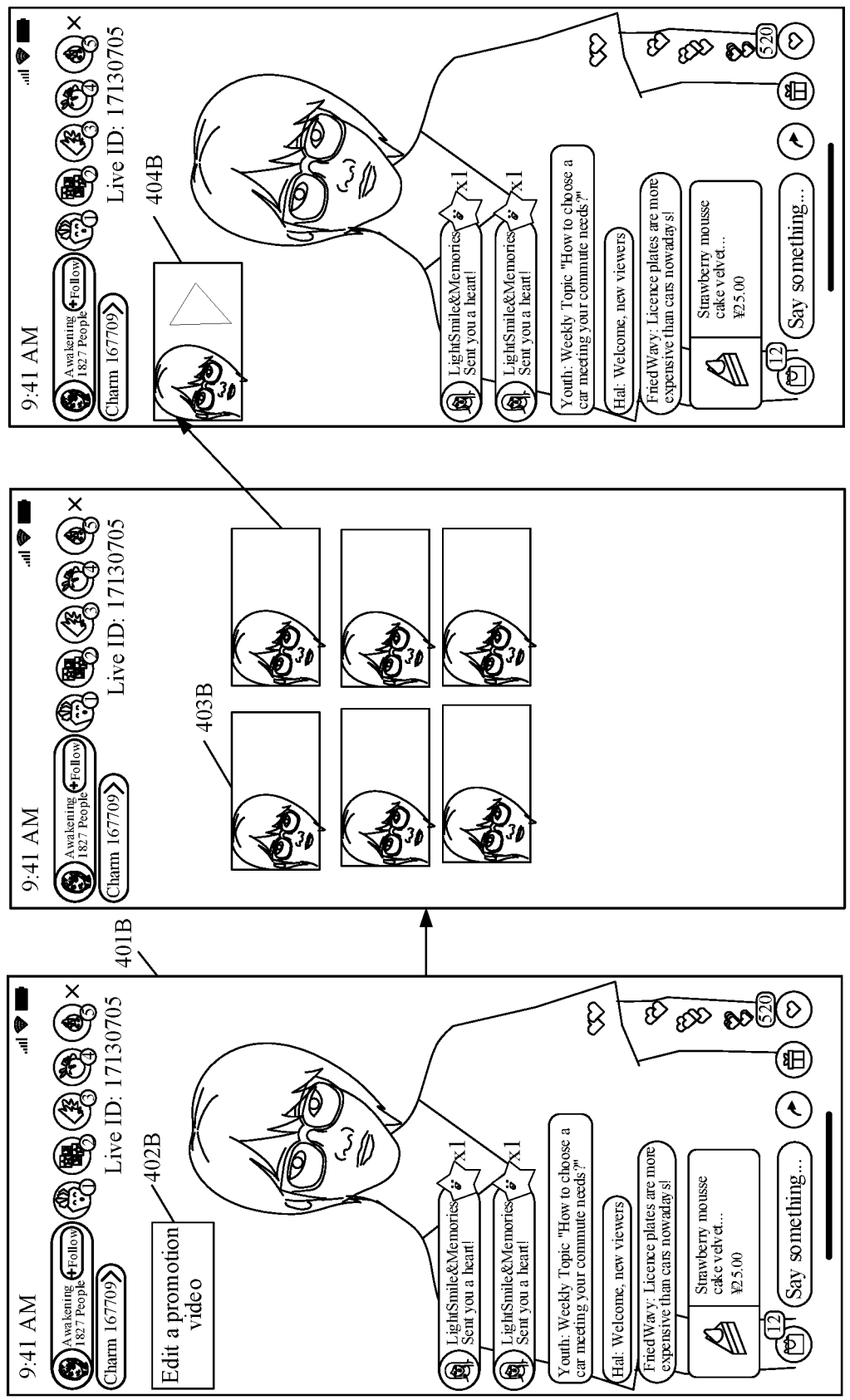

FIG. 5B is a schematic diagram of an interface of a livestreaming processing method according to an embodiment of this application. A trigger operation on a promotion video editing operation control 402B is received in a livestreaming page 401B to display candidate video clips 403B for selection, a selection operation on the candidate video clips 403B is received in the livestreaming page 401B to generate the promotion video, and the generated promotion video 404B is displayed in the livestreaming page 401B.

In an example, for the foregoing "sorted at the top", a quantity may be set as a constraint condition for limitation or a required duration of a promotion video may be used as a constraint condition for limitation. During video clip synthesis, real-time video clips are first used for synthesis to ensure the timeliness of video content in a promotion video. A historical video clip continues to be used to be further synthesized together with real-time video clips into a promotion video only when a total length of the real-time video clips is not sufficient for generating one promotion video, that is, an accumulated duration of all real-time video clips is less than a required duration of a promotion video or an accumulated clips quantity of all real-time video clips of all real-time video clips is less than a required clip quantity of a promotion video.

Step 103: Transmit the promotion video, the promotion video being used for jumping to a livestreaming page of the livestreaming room in response to being triggered. In some embodiments, the promotion video is transmitted to a plurality of social networking accounts of a social networking application. When a user associated with one of the plurality of social networking accounts receives the promotion video, the user can play the promotion video and then join the livestreaming room via an option (e.g., a link) provided by the promotion video.

In some embodiments, when a livestreamer image in the livestreaming page is in an area outside a recommended area, a recommended imaging area is displayed in the livestreaming page, and prompt information is displayed. The prompt information is used for prompting to adjust an imaging position of a livestreamer into the recommended imaging area.

In an example, the foregoing technical solution may be performed at any moment after livestreaming is started. Once it is detected that the livestreamer image in the livestreaming page is in an area outside the recommended area, the recommended imaging area is displayed, and the prompt information is displayed. A livestreamer user may learn from the prompt information that the current livestreamer image is outside the recommended area and learn a position of the recommended imaging area in the screen, to facilitating adjustment.

Figure 4C:
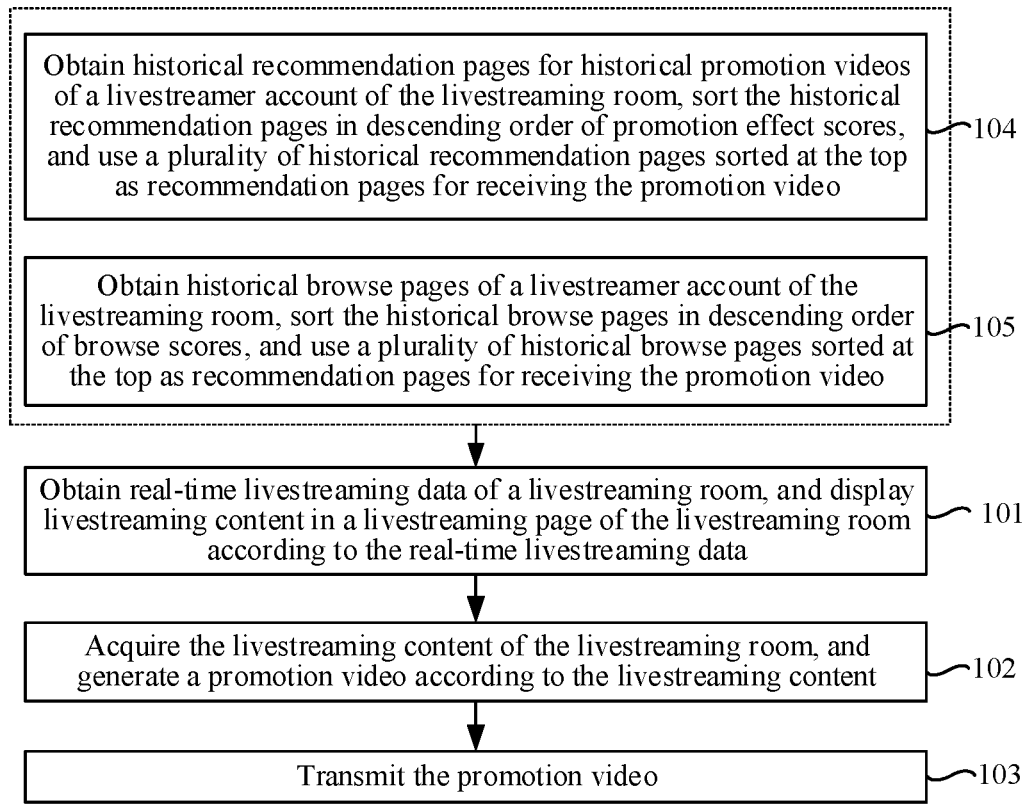

FIG. 4C is a schematic flowchart of a livestreaming processing method according to an embodiment of this application. Step 104 shown in FIG. 4C is used for description. A target for transmitting the promotion video includes a recommendation page. Before step 103 is performed, step 104 and/or step 105 may be performed to determine a recommendation page.

Step 104: Obtain historical recommendation pages for historical promotion videos of a livestreamer account of the livestreaming room, sort the historical recommendation pages in descending order of promotion effect scores, and use a plurality of historical recommendation pages sorted at the top as recommendation pages for receiving the promotion video.

Step 105: Obtain historical browse pages of a livestreamer account of the livestreaming room, sort the historical browse pages in descending order of browse scores, and use a plurality of historical browse pages sorted at the top as recommendation pages for receiving the promotion video.

In an example, a similarity between a livestreaming topic of the real-time livestreaming content and a topic of a candidate recommendation page is determined, and a candidate recommendation page with a similarity greater than a similarity threshold is determined as a recommendation page. A similarity between a livestreaming type of the real-time livestreaming content and a type of a candidate recommendation page is determined, and a candidate recommendation page with a similarity greater than a similarity threshold is determined as a recommendation page. The candidate recommendation page includes a historical recommendation page and a historical browse page. The historical recommendation page is a historical recommendation page used to be delivered by a historical promotion video of the livestreamer account of the livestreaming room. The historical browse page is a page used to be browsed by a social account or an information flow account associated with the livestreamer account of the livestreaming room.

Figure 4D:
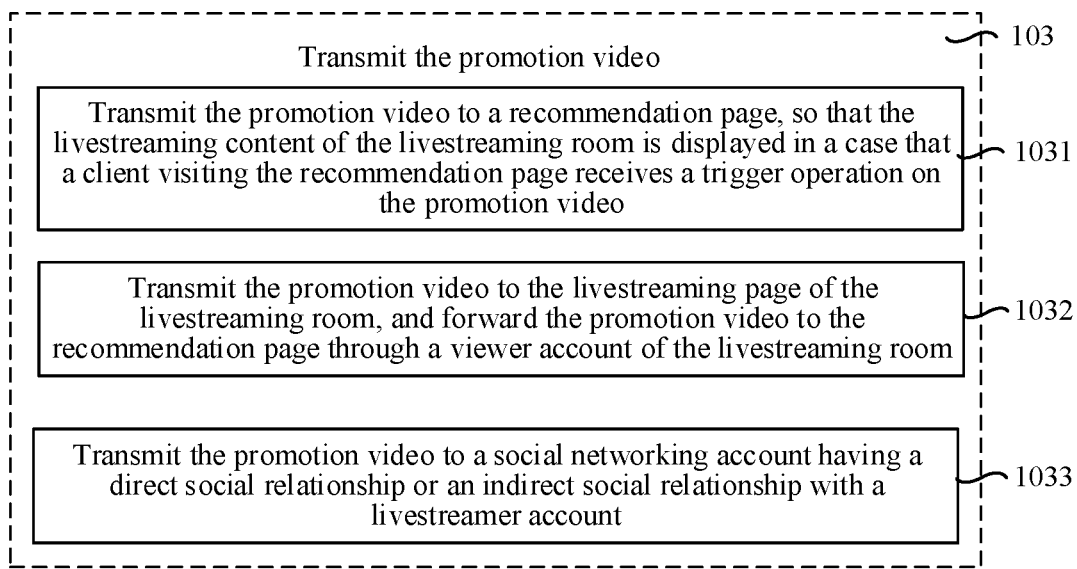

FIG. 4D is a schematic flowchart of a livestreaming processing method according to an embodiment of this application. Steps 1031 to 1033 shown in FIG. 4D are described. The transmitting the promotion video in step 103 may be implemented by performing at least one of step 1031, 1032, or 1033.

Step 1031: Transmit the promotion video to a recommendation page, so that the livestreaming content of the livestreaming room is displayed when a client visiting the recommendation page receives a trigger operation on the promotion video.

Step 1032: Transmit the promotion video to the livestreaming page of the livestreaming room, and forward the promotion video to the recommendation page through a viewer account of the livestreaming room.

Step 1033: Transmit the promotion video to a social networking account having a direct social relationship or an indirect social relationship with a livestreamer account.

In some embodiments, when the promotion video is transmitted to the recommendation page and a validity period of the promotion video has ended, the promotion video is in a transmission forbidden state on a client with a social networking account.

In an example, the promotion video may continue to be forwarded by the social networking account to another social networking account or forwarded to a recommendation page. The social networking account receiving the promotion video may share the promotion video at any time after receiving the promotion video or share the promotion video within a validity period. The validity period is a sharing expiry time or a sharing expiry quantity. In a case that the validity period is a sharing expiry time, the validity period is a time between a time point at which the promotion video is generated to a predetermined end time point of the livestreaming or the validity period is a set duration starting from the moment at which the account receiving the promotion video receives the promotion video. In a case that the validity period is a sharing expiry quantity, the validity period is a set quantity of times that the promotion video is allowed to be shared. The validity period may be carried in the promotion video or may be stored in the server. After receiving the promotion video, the client with the receiving account may query the validity period on the server. In a case that the validity period is not exceeded, the client with the receiving account has the right to share the promotion video and share the promotion video to the recommendation page. In a case that the validity period is updated, for example, the predetermined end time of the livestreaming is changed (the livestreaming is ended in advance or extended), the server pushes a validity period update notification to clients with viewer accounts that used to query the validity period on the server and/or have received the promotion video.

In some embodiments, before the transmitting the promotion video to a recommendation page, the following technical solution may be further performed: querying an authorized promotion duration corresponding to the livestreamer account in response to a valid promotion duration operation; determining to transmit the promotion video to the recommendation page when the authorized promotion duration does not exceed a free promotion duration of the recommendation page; when a valid promotion duration exceeds the free promotion duration of the recommendation page, displaying a payment page to perform a payment procedure for a difference between the authorized promotion duration and the free promotion duration, and determining to transmit the promotion video to the recommendation page after the payment procedure is completed.

In some embodiments, when the promotion video is transmitted and the validity period of the promotion video has ended, the promotion video is deleted from the recommendation page.

In some embodiments, when at least one of the following conditions is satisfied, it is determined that the validity period of the promotion video has ended: a duration for which the promotion video is present in the recommendation page exceeds a duration threshold; a promotion expiry time of the promotion video is reached; an accumulated exposure duration of the promotion video in the recommendation page reaches an exposure duration threshold; the livestreaming corresponding to the promotion video ends; livestreaming of the same topic corresponding to the promotion video ends; and a promotion end operation for the promotion video is received.

In an example, the duration for which the promotion video is present in the recommendation page exceeding the duration threshold includes the following cases: a duration for which the promotion video is exposed in the recommendation page exceeds a promotion duration threshold, specifically, a duration for which the promotion video is presented on a client when the client visits the recommendation page, and a duration for which the promotion video is associated with (that is, displayed as content in the recommendation page) the recommendation page. The duration is determined in the following manner: the duration is counted starting from the moment at which the promotion video is transmitted to the recommendation page. The promotion duration threshold is determined in any of the following manners: the same promotion duration threshold is set for all promotion videos, the promotion duration threshold is separately set in response to a setting operation of the livestreamer account during promotion by the livestreamer account, or the promotion duration threshold is directly automatically set by the backend server according to account information of the livestreamer account. The account information includes an account grade of the livestreamer, a registration time of the livestreamer, historical livestreaming traffic statistics of the livestreamer, a popularity score of historical livestreaming of the livestreamer.

In some embodiments, after the promotion video is displayed in the recommendation page, the promotion video is played in the recommendation page; and when a play duration of the promotion video reaches a play duration threshold, a link control of the livestreaming room is displayed on the promotion video, the link control being used for jumping from the recommendation page to display the livestreaming page.

In an example, the client implementing the foregoing embodiments is a client visiting the recommendation page. The promotion video is played on the recommendation page. In a case that the play duration of the promotion video reaches the play duration threshold, the link control used for jumping to the livestreaming room is displayed on the promotion video, or during the playing of the promotion video, the link control used for jumping to the livestreaming room is directly displayed on the promotion video.

Figure 4E:
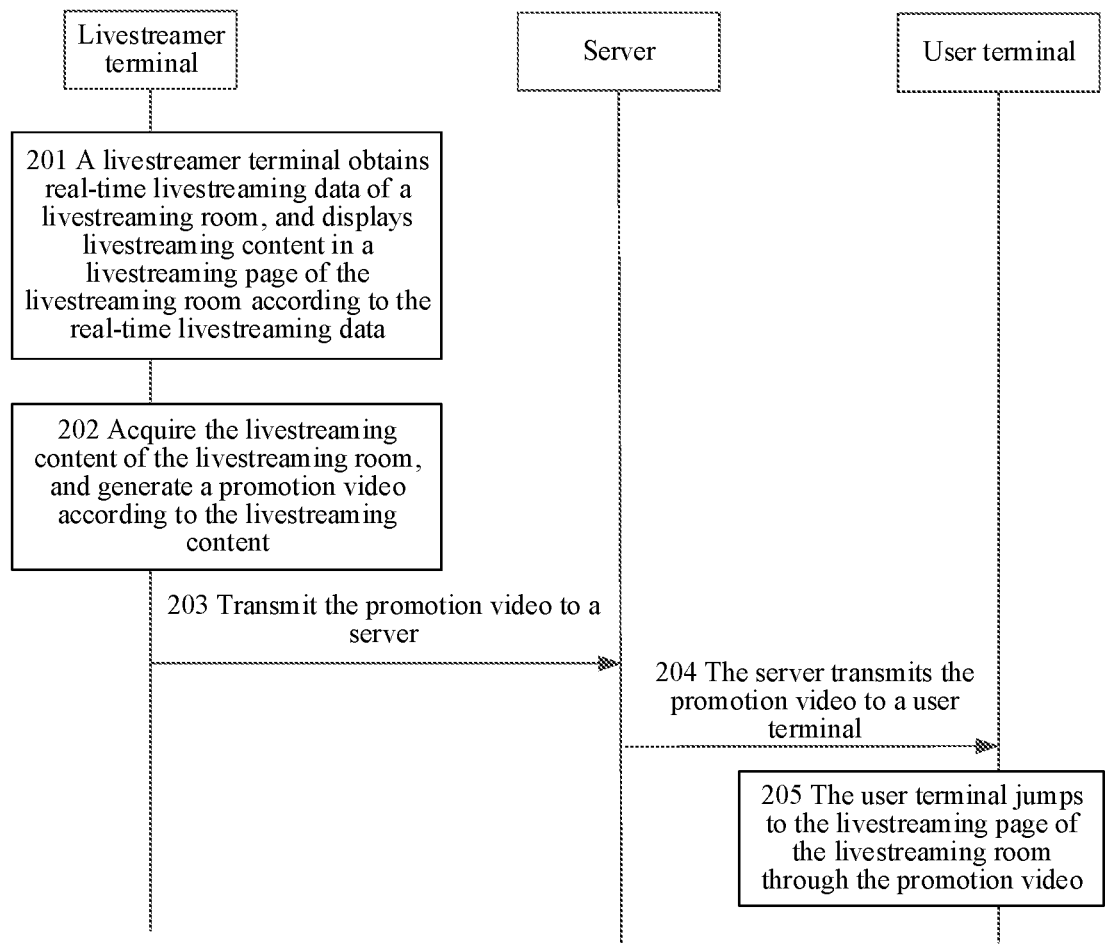

FIG. 4E is a flowchart of a livestreaming processing method according to an embodiment of this application. Step 201: A livestreamer terminal obtains real-time livestreaming data of a livestreaming room, and displays livestreaming content in a livestreaming page of the livestreaming room according to the real-time livestreaming data. Step 202: Acquire the livestreaming content of the livestreaming room, and generate a promotion video according to the livestreaming content. Step 203: Transmit the promotion video to a server, the promotion video being used for jumping to a livestreaming page of the livestreaming room in response to being triggered. Step 204: The server transmits the promotion video to a user terminal associated with a social networking account of a social networking application. Step 205: A viewer at the user terminal jumps to the livestreaming page of the livestreaming room through the promotion video.

An exemplary application of the livestreaming processing method provided in the embodiments of this application in an actual application scenario is described below.

The embodiments of this application provide a livestreaming processing method to improve the conversion rate of delivery of livestreaming clips. Great content in a livestreaming room is recognized based on interaction popularity (comprehensive scores such as comments, shopping, tips, and face recognition) of the livestreaming room, a highlight video collection (that is, a promotion video) of a current livestream session is automatically generated, and then the highlight video collection is delivered into an information flow. The highlight video collection with short videos is used to attract users browsing the information flow to the livestreaming content, thereby improving the conversion rate of delivery of livestreaming clips and the watching duration of users entering the livestreaming room.

In some embodiments, during livestreaming, the livestreamer terminal transmits real-time livestreaming data of a livestreaming room to the server. The server synchronizes the real-time livestreaming data to various terminals (the livestreamer terminal, the viewer terminal, and the information flow terminal) in the livestreaming room. The viewer terminal returns interaction data to the livestreamer terminal through the server and displays an interaction result on the livestreamer terminal. The livestreamer terminal generates a score of corresponding livestreaming content according to the interaction data. In a case that the score exceeds a score threshold, the livestreamer terminal automatically records the screen for the real-time livestreaming content to obtain a promotion video, and transmits the promotion video through to the information flow terminal through the server, to allow a user of the information flow terminal to jump to the livestreaming room of the livestreamer through a trigger operation on the promotion video and allow the information flow terminal to display the livestreaming content like the viewer terminal.

The livestreaming processing method provided in the embodiments of this application is mainly applied to delivery and recommendation of livestreaming clips, and the artificial intelligence technology is used to improve the conversion rate of delivery of livestreaming clips. Great content in a livestreaming room is recognized based on interaction popularity (comprehensive scores such as comments, shopping, tips, and face recognition) of the livestreaming room, a highlight video collection (a promotion video) of a current livestream session is automatically generated, and then the highlight video collection is delivered into an information flow. The highlight video collection with short videos is used to attract users browsing the information flow to the livestreaming content, thereby improving the conversion rate of delivery of livestreaming clips and the watching duration of users entering the livestreaming room.

Figure 6A:
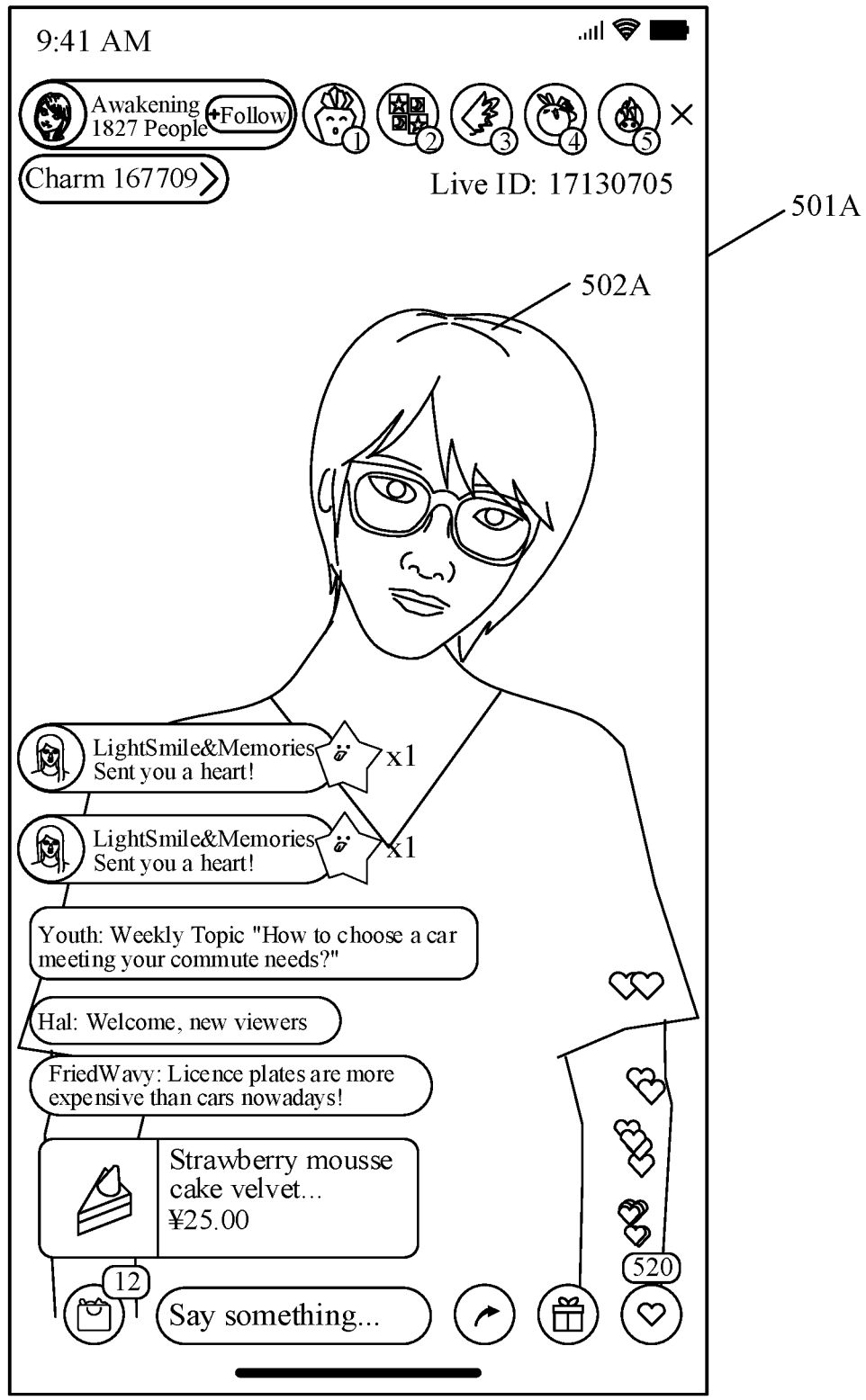
FIG. 6A and FIG. 6B are schematic flowcharts of an interface of a livestreaming processing method according to an embodiment of this application.
Figure 6B:
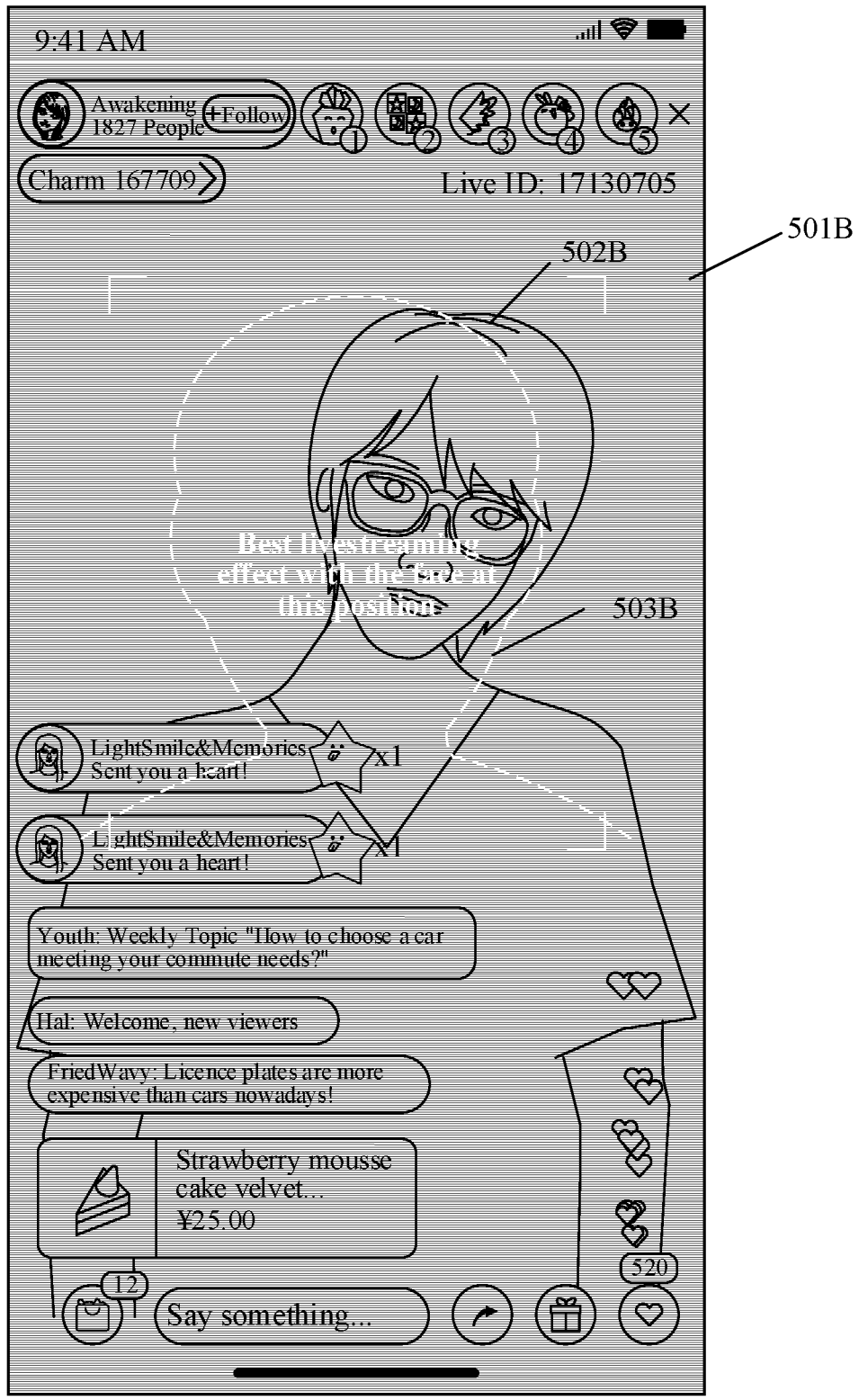

FIG. 6A and FIG. 6B are schematic diagrams of an interface of a livestreaming processing method according to an embodiment of this application. 501A and 501B are livestreaming pages. 502A and 502B are a livestreamer in the livestreaming pages. 503B is a prompt area in the livestreaming page, and is used for prompting a core recommended position for the face of the livestreamer in the livestreaming room. The livestreaming pages 501A and 501B present comment content, gifting content, commodity content, and the like. In response to detecting that a duration for which the face of the livestreamer is not at the core recommended position 503B in the livestreaming room exceeds 5 s, a black mask is added to a background layer of a client of the livestreamer, and the black mask is used for displaying prompt information to the livestreamer, to prompt that the effect of livestreaming is better when livestreaming is performed at the core recommended position of the livestreaming room. The face position detection is also a dimension for a popularity score of the livestreaming room.

Figure 7A:
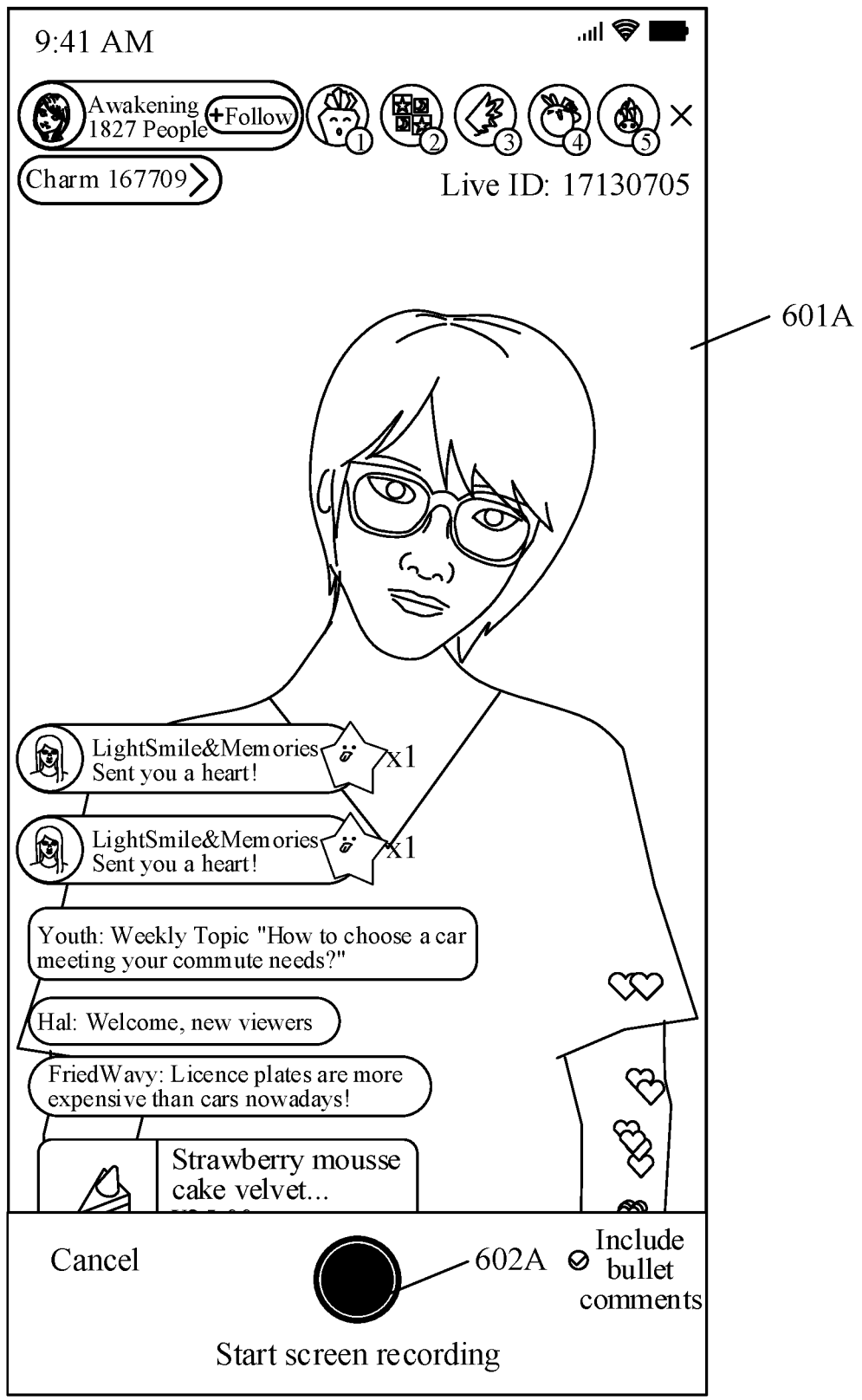
FIG. 7A and FIG. 7B are schematic flowcharts of an interface of a livestreaming processing method according to an embodiment of this application.
Figure 7B:
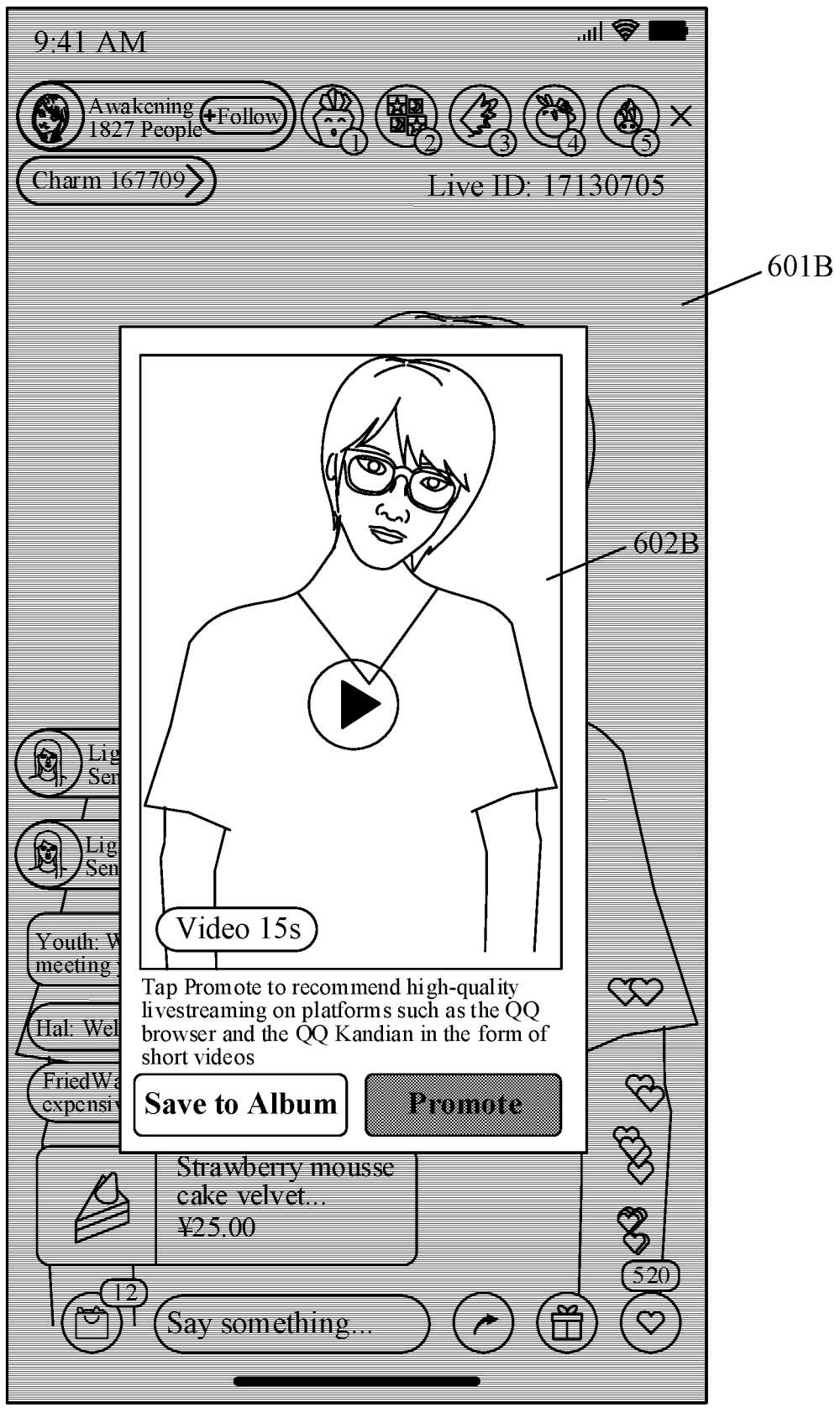

FIG. 7A and FIG. 7B are schematic diagrams of an interface of a livestreaming processing method according to an embodiment of this application. An active screen recording operation of a livestreamer account is received in a livestreaming page 601A. The active screen recording operation is triggered by a screen recording control 602A in the livestreaming page 601A. A livestreaming page 601B is displayed after screen recording ends. A pop-up window interface 602B generated after screen recording ends is displayed in the livestreaming page 601B. A trigger operation of the livestreamer account on a save control in the pop-up window interface 602B is used to save a recorded video in a local device. Alternatively, a trigger operation of the livestreamer account on a promotion control in the pop-up window interface 602B is used to promote high-quality livestreaming content on a recommendation platform in the form of a short video.

Figure 8A:
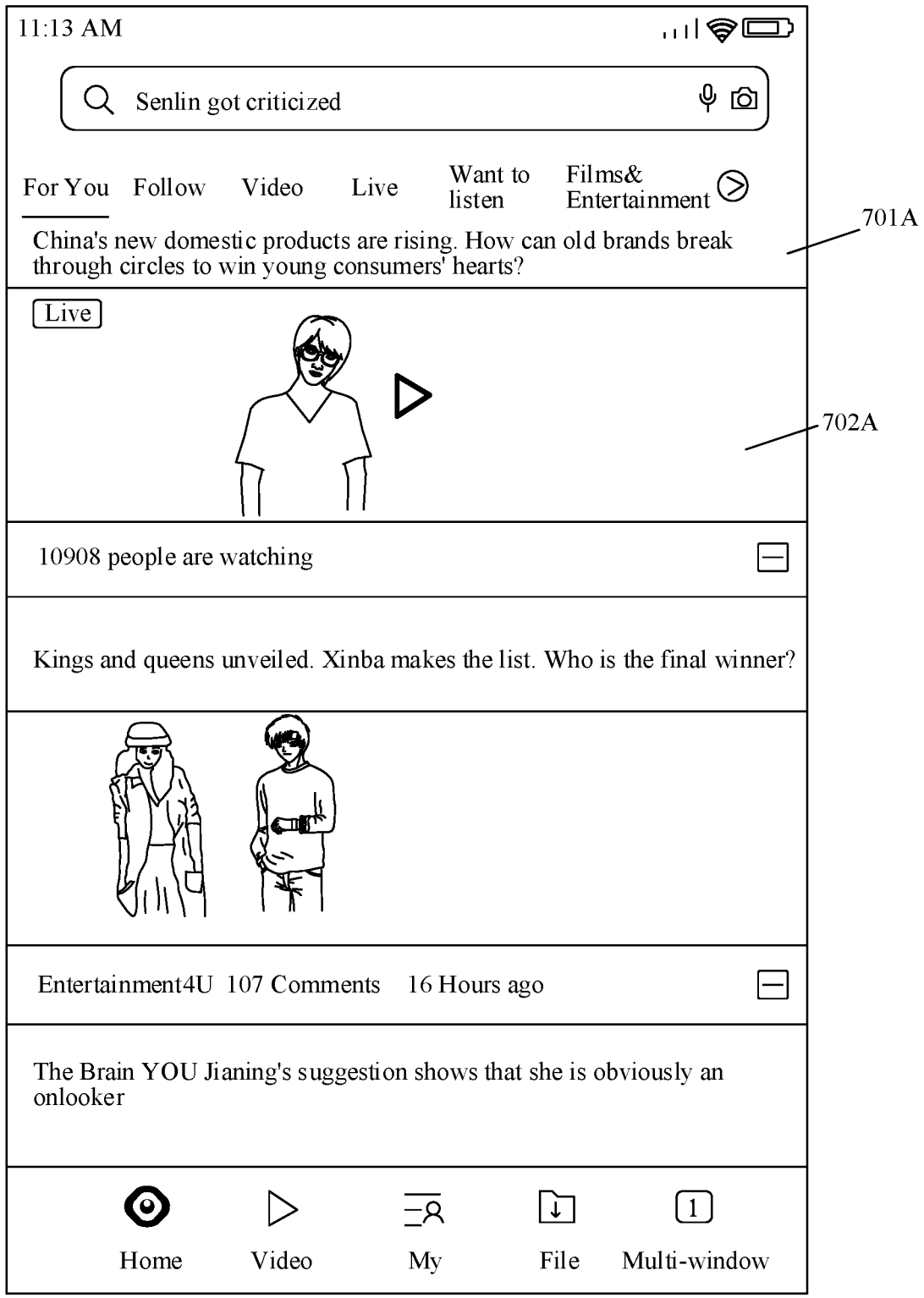
FIG. 8A and FIG. 8B are schematic flowcharts of an interface of a livestreaming processing method according to an embodiment of this application.
Figure 8B:
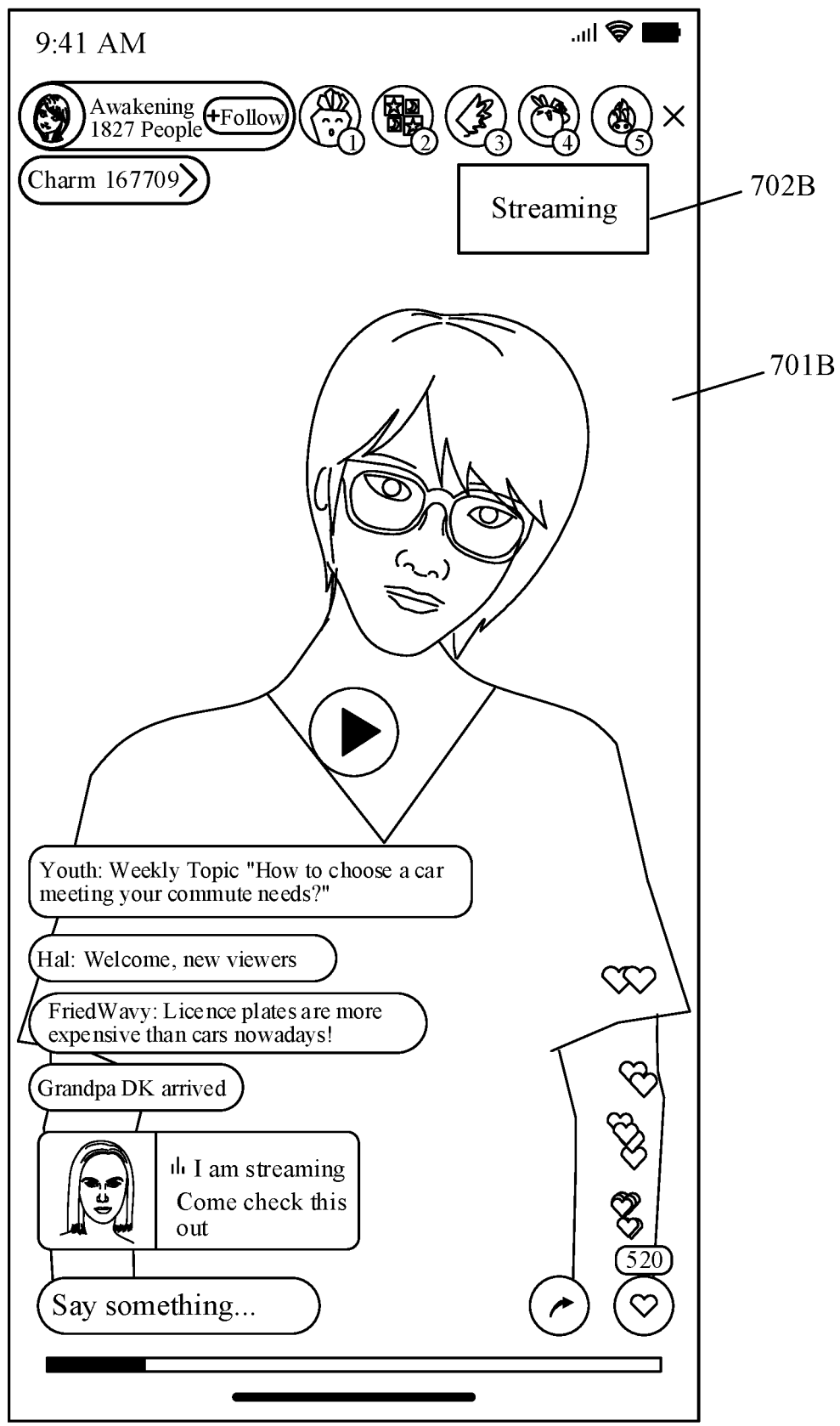

FIG. 8A and FIG. 8B are schematic diagrams of an interface of a livestreaming processing method according to an embodiment of this application. 701A is an information flow page. The information flow page 701A displays a promoted promotion video 702A. A livestreaming tag is provided in a cover of the promotion video 702A in the information flow page 701A. A promotion video play page 701B is entered through a tap operation of the livestreamer account on the cover of the promotion video 702A. The promotion video is played in the promotion video play page 701B for a user to watch first. The livestreaming room of the livestreamer is entered through a tap operation of the livestreamer account on a floating layer 702B being streamed for the promotion video. A promotion video is delivered in real time to an information flow page based on livestreaming content. Therefore, content of the promotion video is closely related to content in a livestreaming room, thereby avoiding a case that a user is attracted to enter the livestreaming room to find that the livestreaming content is distantly related to the content of the promotion video.

Figure 9:
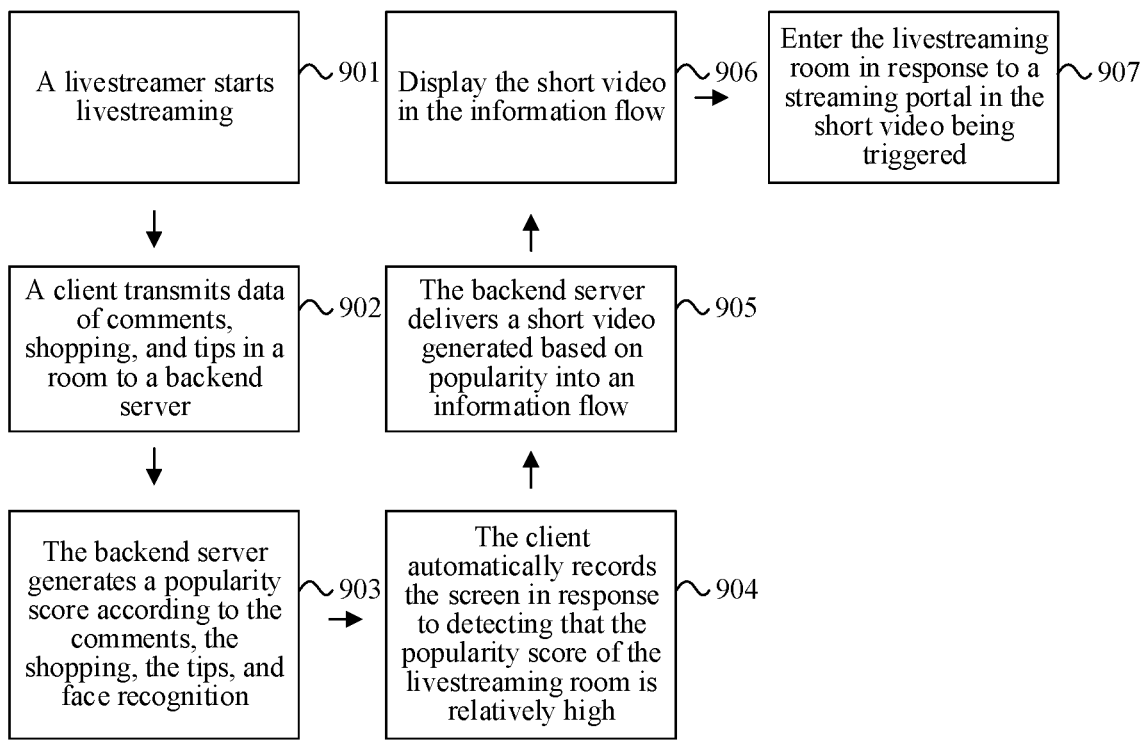
FIG. 9 is a schematic flowchart of control of a livestreaming processing method according to an embodiment of this application.

FIG. 9 is a schematic flowchart of control of a livestreaming processing method according to an embodiment of this application. Step 901: A livestreamer starts livestreaming. Step 902: The client uploads data of comments, shopping, and tips in a livestreaming room to a server. Step 903: The backend server generates a popularity score according to the data. Step 904: The client automatically records the screen in response to detecting that the popularity score of the livestreaming room is relatively high to obtain a short video. Step 905: The backend server delivers a short video generated based on popularity into an information flow. Step 906: Display the short video in the information flow. Step 907: Enter the livestreaming room in response to a streaming portal in the short video being triggered. After livestreaming is started, the client collects the data of comments, the data of shopping, and the data of tips and gifts in the livestreaming room every second, and uploads the data and timestamps at which the data is generated to the backend server. The backend server records the data and generates the popularity score of the livestreaming room in combination with a face recognition result. The principle of generating a popularity score is as follows: a popularity score of a livestreaming room=an initial score+a popularity score generated through user interaction (comments, shopping, and tips)+a portrait score, referring to Formula (1):

$$\text{Score}=S0+S(\text{Users})+S(\text{Face recognition}) \quad (1),$$

where Score is a popularity score generated according to the data, S0 is an initial score, S(Users) is a popularity score generated through user interaction, and S(Face recognition) is a portrait score.

After livestreaming is started, an initial score is assigned to a current livestream session. In this case, the livestream session enters a recommendation list for ranking. Different initial scores are assigned to different livestreaming types. For example, face attractiveness livestreaming, talent livestreaming, game livestreaming, dance livestreaming, and campus livestreaming have different initial scores. An initial score assignment module assigns initial scores according to weights of attention of viewers on a platform. The initial score is set to a variable. For example, S0 (face attractiveness)=1.4*S0, S0 (sing)=1.2*S0, S0 (dance)=1.2*S0, S0 (campus)=1.0*S0, and S0 (game)=0.8*S0.

As visiting users enter a livestreaming room, commenting behavior, shopping behavior, and tipping behavior, and the like of the users are considered to help to increase the popularity of the livestream session. The interaction behavior of users in the livestreaming room includes the following four types of behavior: watching behavior of the users entering the room, commenting behavior, shopping behavior, and tipping behavior. A real-time popularity score generated from user interaction in the livestreaming room can be obtained by assigning scores to different behavior. The scores assigned to different behavior are, for example, 1, 5, 10, and 20 respectively. The rule for the popularity score generated from user interaction is variable. In a case that the scale of users is small (a quantity of users is less than a user scale threshold), in this case, a behavior score (a behavior score corresponding to the quantity of users) of each event needs to be increased, thereby improving the influence of user behavior. In a case that the scale of users increases (the quantity of users is not less than the user scale threshold), the behavior score (the behavior score corresponding to the quantity of users) of each event is also to be increased. In this way, it is ensured that for different scales of users, the popularity score generated from user interaction remains basically stable. The popularity score (2) generated from user interaction is as follows.

$$S(\text{Users}) = (1*\text{the watching behavior} + 5*\text{the commenting behavior} + 10*\text{the shopping behavior} + 20*\text{the tipping behavior})/\text{DAU}*N \quad (2),$$

where DAU is a quantity of daily active users, and N is a fixed value, and is a quantity of times of categorizing the watching behavior, the commenting behavior, the shopping behavior, and the tipping behavior.

For the portrait score, a display interface of the client displays a recommended face position in livestreaming. In response to detecting that the face of a livestreamer is within the recommended face position, the portrait score is 10, and a duration is s1. In response to detecting that the face of a livestreamer is not within the recommended face position, the portrait score is 5, and a duration is s2. A calculation formula (3) of the portrait score is as follows:

$$S(\text{Face recognition}) = 10*s1 - 5*s2 \quad (3),$$

The implementation principle of the portrait score is as follows: a client monitors and recognizes facial features of a user in real time. The portrait score mainly includes three processes: face detection, feature extraction, and face recognition. During face detection, the client extracts a face image from frame images of a video and uses Hal features and an iterative algorithm to train a cascade classifier to classify each piece of the image. If a rectangular area passes through the cascade classifier, the rectangular area is identified as a face image. During detection, a face is found by continuously adjusting the position and proportion of a detection window in an image. During feature extraction, the expression and pose features of a livestreamer are extracted after the face of the livestreamer is detected. The feature extraction refers to the characterization of face information by numbers (the extracted features), and common facial features are categorized into two categories, namely, geometric features and representational features. The geometric features refer to geometric relationships such as a distance relationship, an area relationship, and an angle relationship between facial features such as the eyes, nose, and mouth. The representational features are global or local features extracted by using grayscale information of the face image through an algorithm. A relatively common feature extraction algorithm is a local binary pattern algorithm. The local binary pattern algorithm first divides an image into several areas. A central value is used to perform thresholding in a 640×960 neighborhood of pixels in each area, and a result is used as a binary number. During face recognition and position proofreading, when a face is detected, the client transmits recognized facial features of a user and position information to a backend server. The backend server performs matching with a preset face position and detects the face position of a liverstreamer in real time for a duration s1 within a recommended face position and a duration s2 outside a recommended face position, and performs calculation by using the foregoing Formula (3).

In some embodiments, when the client detects that the score of the livestreaming room is relatively high (the score exceeds the score threshold), the client automatically records the screen. The client requests backend data in real time, and returns a current popularity score of the livestreaming room. In a case that the client detects that the popularity score of the livestreaming room is relatively high (the score exceeds the score threshold), the client automatically records the screen and generates a short video. The evaluation standard for scoring (the score threshold) is based on a platform streaming amount and is variable. In a case that livestreaming has a score exceeding scores of 80% platform livestreaming sessions on the platform, the livestreaming is determined as livestreaming with relatively high popularity. That is, the score threshold is set to a minimum score in scores of top 20% of livestreaming with high scores.

In some embodiments, in response to an active selection of a camera recording function of the livestreamer account, the client transmits the generated short video to the backend server for scoring. In response to the active selection of the camera recording function of the livestreamer account, the client records the interface of the livestreaming room and generates the short video. In response to an operation of tapping a Save to Album button of the livestreamer account, the generated short video is directly saved locally. In response to an operation of tapping a Promote button of the livestreamer account, in addition to directly saving the generated short video locally, the client transmits the generated short video to the backend server. The backend server performs a scoring process similar to that in the foregoing embodiments based on the content of the short video. A short video with a score exceeding the score threshold is delivered into an information flow.

In some embodiments, the server transmits the short video generated based on a score of the livestreaming room into the information flow. After completing the screen recording operation, the client uploads the generated short video to the server. The server delivers a short video with a livestreaming parameter into an information flow of a user based on a CDN. In this case, a user watching the information flow first sees the delivered short video. If the user is interested in the short video, in response to a tap operation of a user account on a "Streaming" control, the user enters the corresponding livestreaming room to watched detailed livestreaming.

The livestreaming processing method provided in the embodiments of this application may also be applied to secondary editing and delivery of livestreaming playback. Great clips in livestreaming playback are recognized and delivered into an information flow, thereby improving the efficiency of secondary utilization and delivery of livestreaming content. Livestreaming playback in the related art is excessively redundant and depends on manual editing, which is not conducive to delivery into an information flow for secondary dissemination.

An exemplary structure of the livestreaming processing apparatus 455 provided in the embodiments of this application being implemented as a software module continues to be described below. In some embodiments, as shown in FIG. 3, software modules in the livestreaming processing apparatus 455 stored in the memory 450 may include: an obtaining module 4551, configured to obtain real-time livestreaming data of a livestreaming room, and display livestreaming content in a livestreaming page of the livestreaming room according to the real-time livestreaming data; an acquisition module 4552, configured to: acquire the livestreaming content of the livestreaming room, and generate a promotion video according to the livestreaming content; and a transmission module 4553, configured to transmit the promotion video.

In the foregoing solution, the acquisition module 4552 is further configured to: acquire historical livestreaming content of the livestreaming room, and generate at least one historical video clip according to the historical livestreaming content, the historical livestreaming content and real-time livestreaming content of the livestreaming room belonging to the same livestream session or the historical livestreaming content and real-time livestreaming content of the livestreaming room belonging to the same topic; acquire the real-time livestreaming content of the livestreaming room, and generate at least one real-time video clip according to the real-time livestreaming content; and generate the promotion video according to the at least one historical video clip and/or the at least one real-time video clip.

In the foregoing solution, the acquisition module 4552 is further configured to: perform at least one of the following operations: cut at least one historical video clip with a score exceeding a score threshold from the historical livestreaming content; and cut, in response to a cutting operation on the historical livestreaming content, at least one historical video clip from the historical livestreaming content according to a cutting starting point and a cutting end point, the cutting starting point and the cutting end point being set based on the cutting operation.

In the foregoing solution, the acquisition module 4552 is further configured to: obtain interaction data corresponding to the historical livestreaming content within each sampling window duration, a livestreamer image display area corresponding to the historical livestreaming content within the each sampling window duration, and a livestreaming class to which the historical livestreaming content belongs; determine a score of the historical livestreaming content within the each sampling window duration according to the interaction data, the livestreamer image display area, and the livestreaming class; and form at least one historical video clip according to historical livestreaming content with a score exceeding the score threshold within at least one sampling window duration.

In the foregoing solution, the acquisition module 4552 is further configured to: obtain an initial score corresponding to the livestreaming class and a portrait score corresponding to the livestreamer image display area; multiply scores of interaction data of each type and interaction data of a corresponding type to obtain a popularity score corresponding to the interaction data; and add the initial score, the portrait score, and the popularity score to obtain the score of the historical livestreaming content within the each sampling window duration.

In the foregoing solution, the acquisition module 4552 is further configured to: acquire the livestreaming content of the livestreaming room in real time within a preset sampling window duration in response to a promotion video acquisition operation, and generate a corresponding real-time video clip according to the real-time livestreaming content acquired within the sampling window duration; and filter out a real-time video clip with a score less than a score threshold from a plurality of generated real-time video clips to obtain the at least one real-time video clip.

In the foregoing solution, the acquisition module 4552 is further configured to: determine a score of the real-time livestreaming content of the livestreaming room for each time point of real-time playing; and start to acquire the real-time livestreaming content of the livestreaming room with a time point at which the score of the real-time livestreaming content exceeds a score threshold as a starting point, and generate the at least one real-time video clip according to the acquired real-time livestreaming content.

In the foregoing solution, the acquisition module 4552 is further configured to: obtain interaction data of the real-time livestreaming content at each time point, a livestreamer image display area at each time point, and a livestreaming class to which the real-time livestreaming content belongs at each time point; obtain an initial score corresponding to the livestreaming class and a portrait score corresponding to the livestreamer image display area; multiply scores of interaction data of each type and interaction data of a corresponding type to obtain a popularity score corresponding to the interaction data; and add the initial score, the portrait score, and the popularity score to obtain a score of the real-time livestreaming content at each time point.

In the foregoing solution, the acquisition module 4552 is further configured to: start to acquire the real-time livestreaming content of the livestreaming room with the time point at which the score of the real-time livestreaming content exceeds the score threshold as the starting point, and stop the acquisition when the acquisition reaches a time point at which a minimum required duration of the promotion video is satisfied; and generate the at least one real-time video clip according to the acquired real-time livestreaming content.

In the foregoing solution, the acquisition module 4552 is further configured to: start to acquire the real-time livestreaming content of the livestreaming room with the time point at which the score of the real-time livestreaming content exceeds the score threshold as the starting point; when scores of the real-time livestreaming content at all time points within a minimum required duration exceed the score threshold, continue to acquire the real-time livestreaming content of the livestreaming room, and stop the acquisition when the acquisition reaches a time point at which a score of the real-time livestreaming content does not exceed the score threshold; and generate the at least one real-time video clip according to real-time livestreaming content acquired between the starting point and an end point, the minimum required duration being counted starting from the starting point.

In the foregoing solution, the acquisition module 4552 is further configured to: start to acquire the real-time livestreaming content of the livestreaming room with the time point at which the score of the real-time livestreaming content exceeds the score threshold as the starting point, and stop the acquisition when the acquisition reaches a time point at which a maximum required duration of the promotion video is satisfied; and generate the at least one real-time video clip according to the acquired real-time livestreaming content.

In the foregoing solution, the acquisition module 4552 is further configured to: start to acquire the real-time livestreaming content of the livestreaming room with the time point at which the score of the real-time livestreaming content exceeds the score threshold as the starting point, and stop the acquisition when the score of the real-time livestreaming content does not exceed the score threshold; start to acquire the real-time livestreaming content of the livestreaming room with the time point at which the score of the real-time livestreaming content exceeds the score threshold again as a new starting point, and stop the acquisition when accumulated acquired real-time livestreaming content satisfies a required duration of the promotion video or the score of the real-time livestreaming content does not exceed the score threshold; and generate the at least one real-time video clip according to the acquired real-time livestreaming content.

In the foregoing solution, the apparatus 455 further includes: a display module 4554, configured to: when a livestreamer image in the livestreaming page is in an area outside a recommended area, display a recommended imaging area in the livestreaming page, and display prompt information, the prompt information being used for prompting to adjust an imaging position of a livestreamer into the recommended imaging area.

In the foregoing solution, a target of the promotion video includes a recommendation page; and the transmission module 4553 is further configured to: before the promotion video is transmitted, determine the recommendation page according to at least one of the following manners: obtain historical recommendation pages for historical promotion videos of a livestreamer account of the livestreaming room, sort the historical recommendation pages in descending order of promotion effect scores, and use a plurality of historical recommendation pages sorted at the top as recommendation pages for receiving the promotion video; and obtain historical browse pages of a livestreamer account of the livestreaming room, sort the historical browse pages in descending order of browse scores, and use a plurality of historical browse pages sorted at the top as recommendation pages for receiving the promotion video.

In the foregoing solution, the transmission module 4553 is further configured to: perform at least one of the following: transmit the promotion video to a recommendation page, so that the livestreaming content of the livestreaming room is displayed when a client visiting the recommendation page receives a trigger operation on the promotion video; transmit the promotion video to the livestreaming page of the livestreaming room, and forward the promotion video to the recommendation page through a viewer account of the livestreaming room; and transmit the promotion video to a social networking account having a direct social relationship or an indirect social relationship with a livestreamer account.

In the foregoing solution, the transmission module 4553 is further configured to: before the promotion video is transmitted to the recommendation page: query an authorized promotion duration corresponding to the livestreamer account in response to a valid promotion duration operation; determine to transmit the promotion video to the recommendation page when the authorized promotion duration does not exceed a free promotion duration of the recommendation page; when a valid promotion duration exceeds the free promotion duration of the recommendation page, display a payment page to perform a payment procedure for a difference between the authorized promotion duration and the free promotion duration, and determine to transmit the promotion video to the recommendation page after the payment procedure is completed.

In the foregoing solution, the transmission module 4553 is further configured to: when the promotion video is transmitted and the validity period of the promotion video has ended, delete the promotion video from the recommendation page.

In the foregoing solution, the transmission module 4553 is further configured to: when the promotion video is transmitted to the recommendation page and a validity period of the promotion video has ended, keep the promotion video in a transmission forbidden state on a client with a social networking account.

In the foregoing solution, the transmission module 4553 is further configured to: when at least one of the following conditions is satisfied, determine that the validity period of the promotion video has ended: a duration for which the promotion video is present in the recommendation page exceeds a duration threshold; a promotion expiry time of the promotion video is reached; an accumulated exposure duration of the promotion video in the recommendation page reaches an exposure duration threshold; the livestreaming corresponding to the promotion video ends; livestreaming of the same topic corresponding to the promotion video ends; and a promotion end operation for the promotion video is received.

An embodiment of this application provides a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the foregoing livestreaming processing method in the embodiments of this application.

The embodiments of this application provide a computer-readable storage medium storing an executable instruction. When being executed by a processor, the executable instruction causes the processor to perform method provided in the embodiments of this application, for example, the livestreaming processing method shown in FIG. 4A to FIG. 4E.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In summary, through the embodiments of this application, a promotion video including content of a livestreaming room is transmitted to allow a user to jump into the livestreaming room through the promotion video, thereby improving the livestreaming conversion rate of the promotion video. As livestreaming content displayed in a promotion video comes from the performance in a livestreaming room, the performance that a user enters the livestreaming room to watch is closely related to the content of the promotion video, thereby improving the visit retention rate of the livestreaming room. In addition, the promotion video is obtained with reference to real-time data in the livestreaming room, thereby improving the timeliness of the promotion video, and reducing server computing resources consumed to frequently recommend useless promotion videos.

The foregoing descriptions are merely embodiments of this application, and are not intended to limit the protection scope of this application. Any modification, equivalent replacement, or improvement made without departing from the spirit and scope of this application falls within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for promoting livestreaming rooms in real time performed by an electronic device, comprising:
    obtaining real-time livestreaming data of a livestreaming room and displaying livestreaming content of the livestreaming room according to the real-time livestreaming data;
    transmitting, to a server, the livestreaming content of the livestreaming room;
    receiving, from the server, interaction data comprising interactions by a plurality of viewer terminals with the livestreaming content, the interaction data corresponding to a plurality of behavior types and including respective timestamps at which the interaction data is generated;
    for a respective sampling window duration of a plurality of sampling window durations:
        determining a respective interaction score for a corresponding portion of the livestreaming content that is displayed during the respective sampling window duration based at least in part on the interaction data having respective timestamps that fall within the respective sampling window duration, wherein the determining includes:
            for each behavior type of the plurality of behavior types, multiplying a respective interaction data corresponding to the respective behavior type with a predetermined value corresponding to the respective behavior type to obtain a respective popularity score of a plurality of popularity scores; and
            summing the plurality of popularity scores;
    generating a promotion video for the livestreaming room from one or more of the plurality of sampling window durations whose associated interaction scores exceeding a predefined threshold; and
    transmitting the promotion video to a plurality of social networking accounts of a social networking application that have not joined the livestreaming room, wherein the transmitted promotion video provides an option for a user associated with one of the plurality of social networking accounts to join the livestreaming room.

2. The method according to claim 1, wherein generating the promotion video comprises:
    acquiring historical livestreaming content of the livestreaming room according to the real-time livestreaming data, and generating at least one historical video clip according to the historical livestreaming content, wherein (i) the historical livestreaming content and real-time livestreaming content of the livestreaming room belong to the same livestream session or (ii) the historical livestreaming content and the real-time livestreaming content of the livestreaming room belong to the same topic;
    acquiring the real-time livestreaming content of the livestreaming room according to the real-time livestreaming data, and generating at least one real-time video clip according to the real-time livestreaming content; and
    generating the promotion video according to the at least one historical video clip and/or the at least one real-time video clip.

3. The method according to claim 2, wherein the acquiring historical livestreaming content of the livestreaming room according to the real-time livestreaming data, and generating at least one historical video clip according to the historical livestreaming content comprises performing at least one of:
    extracting at least one historical video clip with a score exceeding a score threshold from the historical livestreaming content; or
    extracting, in response to a cutting operation on the historical livestreaming content, at least one historical video clip from the historical livestreaming content according to a cutting starting point and a cutting end point, the cutting starting point and the cutting end point being set based on the cutting operation.

4. The method according to claim 3, wherein the extracting at least one historical video clip with a score exceeding a score threshold from the historical livestreaming content comprises:
    obtaining interaction data corresponding to the historical livestreaming content within each sampling window duration of the plurality of sampling window durations, a livestreamer image display area corresponding to the historical livestreaming content within the each sampling window duration, and a livestreaming class to which the historical livestreaming content belongs;
    determining a score of the historical livestreaming content within the each sampling window duration according to the interaction data, the livestreamer image display area, and the livestreaming class; and
    forming at least one historical video clip according to historical livestreaming content with a score exceeding the score threshold within at least one sampling window duration.

5. The method according to claim 4, wherein the determining a score of the historical livestreaming content within the each sampling window duration according to the interaction data, the livestreamer image display area, and the livestreaming class comprises:
    obtaining an initial score corresponding to the livestreaming class and a portrait score corresponding to the livestreamer image display area; and
    adding the initial score, the portrait score, and the respective popularity score to obtain the score of the historical livestreaming content within the each sampling window duration.

6. The method according to claim 2, wherein the acquiring the real-time livestreaming content of the livestreaming room according to the real-time livestreaming data, and generating at least one real-time video clip according to the real-time livestreaming content comprises:

acquiring a portion of the livestreaming content of the livestreaming room according to the real-time livestreaming data in real time within a preset sampling window duration in response to a promotion video acquisition operation, and generating a corresponding real-time video clip according to the real-time livestreaming content acquired within the sampling window duration; and filtering out a real-time video clip with a score less than a score threshold from a plurality of generated real-time video clips to obtain the at least one real-time video clip.

7. The method according to claim 2, wherein the acquiring the real-time livestreaming content of the livestreaming room according to the real-time livestreaming data, and generating at least one real-time video clip according to the real-time livestreaming content comprises:

determining a score of the real-time livestreaming content of the livestreaming room for each time point of real-time playing; and starting to acquire the real-time livestreaming content of the livestreaming room with a time point at which the score of the real-time livestreaming content exceeds a score threshold as a starting point, and generating the at least one real-time video clip.

8. The method according to claim 7, wherein starting to acquire the real-time livestreaming content of the livestreaming room with the time point at which the score of the real-time livestreaming content exceeds the score threshold as the starting point, and generating the at least one real-time video clip according to the acquired real-time livestreaming content comprises:

starting to acquire the real-time livestreaming content of the livestreaming room with the time point at which the score of the real-time livestreaming content exceeds the score threshold as the starting point, and stopping the acquisition when the acquisition reaches a time point at which a minimum required duration of the promotion video is satisfied; and generating the at least one real-time video clip according to the acquired real-time livestreaming content.

9. The method according to claim 7, wherein starting to acquire the real-time livestreaming content of the livestreaming room with the time point at which the score of the real-time livestreaming content exceeds the score threshold as the starting point, and generating the at least one real-time video clip comprises:

starting to acquire the real-time livestreaming content of the livestreaming room with the time point at which the score of the real-time livestreaming content exceeds the score threshold as the starting point;

when scores of the real-time livestreaming content at all time points within a minimum required duration exceed the score threshold, continuing to acquire the real-time livestreaming content of the livestreaming room, and stopping the acquisition when the acquisition reaches a time point at which a score of the real-time livestreaming content does not exceed the score threshold; and generating the at least one real-time video clip according to real-time livestreaming content acquired between the starting point and an end point, the minimum required duration being counted starting from the starting point.

10. The method according to claim 7, wherein starting to acquire the real-time livestreaming content of the livestreaming room with the time point at which the score of the real-time livestreaming content exceeds the score threshold as the starting point, and generating the at least one real-time video clip comprises:

starting to acquire the real-time livestreaming content of the livestreaming room with the time point at which the score of the real-time livestreaming content exceeds the score threshold as the starting point, and stopping the acquisition when the acquisition reaches a time point at which a maximum required duration of the promotion video is satisfied; and generating the at least one real-time video clip according to the acquired real-time livestreaming content.

11. The method according to claim 7, wherein starting to acquire the real-time livestreaming content of the livestreaming room with the time point at which the score of the real-time livestreaming content exceeds the score threshold as the starting point, and generating the at least one real-time video clip comprises:

starting to acquire the real-time livestreaming content of the livestreaming room with the time point at which the score of the real-time livestreaming content exceeds the score threshold as the starting point, and stopping the acquisition when the score of the real-time livestreaming content does not exceed the score threshold;

starting to acquire the real-time livestreaming content of the livestreaming room with the time point at which the score of the real-time livestreaming content exceeds the score threshold again as a new starting point, and stopping the acquisition when accumulated acquired real-time livestreaming content satisfies a required duration of the promotion video or the score of the real-time livestreaming content does not exceed the score threshold; and generating the at least one real-time video clip according to the acquired real-time livestreaming content.

12. The method according to claim 1, wherein a target for transmitting the promotion video comprises a recommendation page; and before the transmitting the promotion video, the method further comprises:

determining the recommendation page according to at least one of the following manners:

obtaining historical recommendation pages for historical promotion videos of a livestreamer account of the livestreaming room, sorting the historical recommendation pages in descending order of promotion effect scores, and using a plurality of historical recommendation pages sorted at the top as recommendation pages for receiving the promotion video; and obtaining historical browse pages of a livestreamer account of the livestreaming room, sorting the historical browse pages in descending order of browse scores, and using a plurality of historical browse pages sorted at the top as recommendation pages for receiving the promotion video.

13. An electronic device, comprising:

a memory, configured to store executable instructions; and a processor, configured to execute the executable instructions stored in the memory, the instructions, when executed by the processor, cause the electronic device to perform operations comprising:

obtaining real-time livestreaming data of a livestreaming room and displaying livestreaming content of the livestreaming room according to the real-time livestreaming data;

transmitting, to a server, the livestreaming content of the livestreaming room;

receiving, from the server, interaction data comprising interactions by a plurality of viewer terminals with the livestreaming content, the interaction data corresponding to a plurality of behavior types and including respective timestamps at which the interaction data is generated;

for a respective sampling window duration of a plurality of sampling window durations:
  determining a respective interaction score for a corresponding portion of the livestreaming content that is displayed during the respective sampling window duration based at least in part on the interaction data having respective timestamps that fall within the respective sampling window duration, wherein the determining includes:
    for each behavior type of the plurality of behavior types, multiplying a respective interaction data corresponding to the respective behavior type with a predetermined value corresponding to the respective behavior type to obtain a respective popularity score of a plurality of popularity scores; and
    summing the plurality of popularity scores;

generating a promotion video for the livestreaming room from one or more of the plurality of sampling window durations whose associated interaction scores exceeding a predefined threshold; and transmitting the promotion video to a plurality of social networking accounts of a social networking application that have not joined the livestreaming room, wherein the transmitted promotion video provides an option for a user associated with one of the plurality of social networking accounts to join the livestreaming room.

14. The electronic device according to claim 13, wherein generating the promotion video comprises:
  acquiring historical livestreaming content of the livestreaming room according to the real-time livestreaming data, and generating at least one historical video clip according to the historical livestreaming content, wherein (i) the historical livestreaming content and real-time livestreaming content of the livestreaming room belong to the same livestream session or (ii) the historical livestreaming content and the real-time livestreaming content of the livestreaming room belong to the same topic;
  acquiring the real-time livestreaming content of the livestreaming room according to the real-time livestreaming data, and generating at least one real-time video clip according to the real-time livestreaming content; and
  generating the promotion video according to the at least one historical video clip and/or the at least one real-time video clip.

15. The electronic device according to claim 14, wherein the acquiring historical livestreaming content of the livestreaming room according to the real-time livestreaming data, and generating at least one historical video clip according to the historical livestreaming content comprises performing at least one of:
  extracting at least one historical video clip with a score exceeding a score threshold from the historical livestreaming content; or
  extracting, in response to a cutting operation on the historical livestreaming content, at least one historical video clip from the historical livestreaming content according to a cutting starting point and a cutting end point, the cutting starting point and the cutting end point being set based on the cutting operation.

16. The electronic device according to claim 15, wherein the extracting at least one historical video clip with a score exceeding a score threshold from the historical livestreaming content comprises:
  obtaining interaction data corresponding to the historical livestreaming content within each sampling window duration of the plurality of sampling window durations, a livestreamer image display area corresponding to the historical livestreaming content within the each sampling window duration, and a livestreaming class to which the historical livestreaming content belongs;
  determining a score of the historical livestreaming content within the each sampling window duration according to the interaction data, the livestreamer image display area, and the livestreaming class; and
  forming at least one historical video clip according to historical livestreaming content with a score exceeding the score threshold within at least one sampling window duration.

17. The electronic device according to claim 14, wherein the acquiring the real-time livestreaming content of the livestreaming room according to the real-time livestreaming data, and generating at least one real-time video clip according to the real-time livestreaming content comprises:
  acquiring a portion of the livestreaming content of the livestreaming room according to the real-time livestreaming data in real time within a preset sampling window duration in response to a promotion video acquisition operation, and generating a corresponding real-time video clip according to the real-time livestreaming content acquired within the sampling window duration; and
  filtering out a real-time video clip with a score less than a score threshold from a plurality of generated real-time video clips to obtain the at least one real-time video clip.

18. The electronic device according to claim 14, wherein the acquiring the real-time livestreaming content of the livestreaming room according to the real-time livestreaming data, and generating at least one real-time video clip according to the real-time livestreaming content comprises:
  determining a score of the real-time livestreaming content of the livestreaming room for each time point of real-time playing; and
  starting to acquire the real-time livestreaming content of the livestreaming room with a time point at which the score of the real-time livestreaming content exceeds a score threshold as a starting point, and generating the at least one real-time video clip.

19. A non-transitory computer-readable storage medium, storing executable instructions that, when being executed by a processor of an electronic device, cause the electronic device to perform operations comprising:
  obtaining real-time livestreaming data of a livestreaming room and displaying livestreaming content of the livestreaming room according to the real-time livestreaming data;
  transmitting, to a server, the livestreaming content of the livestreaming room;
  receiving, from the server, interaction data comprising interactions by a plurality of viewer terminals with the livestreaming content, the interaction data corresponding to a plurality of behavior types and including respective timestamps at which the interaction data is generated;

for a respective sampling window duration of a plurality of sampling window durations:
- determining a respective interaction score for a corresponding portion of the livestreaming content that is displayed during the respective sampling window duration based at least in part on the interaction data having respective timestamps that fall within the respective sampling window duration, wherein the determining includes:
  - for each behavior type of the plurality of behavior types, multiplying a respective interaction data corresponding to the respective behavior type with a predetermined value corresponding to the respective behavior type to obtain a respective popularity score of a plurality of popularity scores; and
  - summing the plurality of popularity scores;

generating a promotion video for the livestreaming room from one or more of the plurality of sampling window durations whose associated interaction scores exceeding a predefined threshold; and transmitting the promotion video to a plurality of social networking accounts of a social networking application that have not joined the livestreaming room, wherein the transmitted promotion video provides an option for a user associated with one of the plurality of social networking accounts to join the livestreaming room.

20. The non-transitory computer-readable storage medium according to claim 19, wherein generating the promotion video comprises:
- acquiring historical livestreaming content of the livestreaming room according to the real-time livestreaming data, and generating at least one historical video clip according to the historical livestreaming content, wherein (i) the historical livestreaming content and real-time livestreaming content of the livestreaming room belong to the same livestream session or (ii) the historical livestreaming content and the real-time livestreaming content of the livestreaming room belong to the same topic;
- acquiring the real-time livestreaming content of the livestreaming room according to the real-time livestreaming data, and generating at least one real-time video clip according to the real-time livestreaming content; and
- generating the promotion video according to the at least one historical video clip and/or the at least one real-time video clip.

\* \* \* \* \*